(12) United States Patent
Ishigaki et al.

(10) Patent No.: US 12,259,230 B2
(45) Date of Patent: Mar. 25, 2025

(54) THREE-DIMENSIONAL MEASUREMENT DEVICE

(71) Applicant: CKD CORPORATION, Aichi (JP)

(72) Inventors: Hiroyuki Ishigaki, Aichi (JP); Tomoru Okada, Aichi (JP); Ikuo Futamura, Aichi (JP)

(73) Assignee: CKD CORPORATION, Aichi (JP)

( * ) Notice: Subject to any disclaimer, the term of this patent is extended or adjusted under 35 U.S.C. 154(b) by 208 days.

(21) Appl. No.: 18/295,845

(22) Filed: Apr. 5, 2023

(65) Prior Publication Data
US 2023/0243643 A1 Aug. 3, 2023

Related U.S. Application Data

(63) Continuation of application No. PCT/JP2021/028093, filed on Jul. 29, 2021.

(30) Foreign Application Priority Data

Oct. 27, 2020 (JP) .................................. 2020-179484

(51) Int. Cl.
 *G01B 11/24* (2006.01)
 *G01B 9/02* (2022.01)
 (Continued)

(52) U.S. Cl.
 CPC ...... *G01B 11/2441* (2013.01); *G01B 9/02007* (2013.01); *G01B 9/02024* (2013.01);
 (Continued)

(58) Field of Classification Search
 CPC ............ G01B 11/2441; G01B 9/02007; G01B 9/02024; G01B 9/0203; G01B 9/02083;
 (Continued)

(56) References Cited

U.S. PATENT DOCUMENTS

2023/0366668 A1* 11/2023 Ishigaki ............. G01B 9/02007

FOREIGN PATENT DOCUMENTS

JP 5289383 B2 9/2013

OTHER PUBLICATIONS

International Search Report issued in corresponding International Application No. PCT/JP2021/028093 mailed Oct. 19, 2021 (5 pages).

(Continued)

*Primary Examiner* — Tony Ko
(74) *Attorney, Agent, or Firm* — Osha Bergman Watanabe & Burton LLP

(57) ABSTRACT

A three-dimensional measurement device includes: a light emitter; an optical system that splits an incident light, irradiates a measurement object with an object light and irradiates a reference plane with a reference light, and recombines the object and reference lights and emits a combined light; an imaging device that takes an image of a light emitted from the optical system; a storage device that stores transmission axis absolute angle data each obtained by a previous actual measurement of an absolute angle of a transmission axis of each polarizer; and a control device that calculates a phase difference between the reference and object lights based on luminance data of each pixel in luminance image data and the transmission axis absolute angle data of each polarizer corresponding to the pixel, and measures a height of the measurement object at the measurement position.

10 Claims, 8 Drawing Sheets

(51) Int. Cl.
 *G01B 9/02001* (2022.01)
 *G01B 9/02015* (2022.01)
(52) U.S. Cl.
 CPC ....... *G01B 9/0203* (2013.01); *G01B 9/02083* (2013.01); *G01B 2290/70* (2013.01)
(58) Field of Classification Search
 CPC ............ G01B 2290/70; G01B 9/02027; G01B 9/02081; G01B 11/0608; G01B 9/02; G01B 11/022; G06T 7/50; G06T 17/00
 See application file for complete search history.

(56) References Cited

OTHER PUBLICATIONS

Written Opinion issued in corresponding International Application No. PCT/JP2021/028093 mailed Oct. 19, 2021 (3 pages).
International Preliminary Report on Patentabililty issued in International Application No. PCT/JP2021/028093; mailed May 11, 2023 (10 pages).

* cited by examiner

FIG. 1
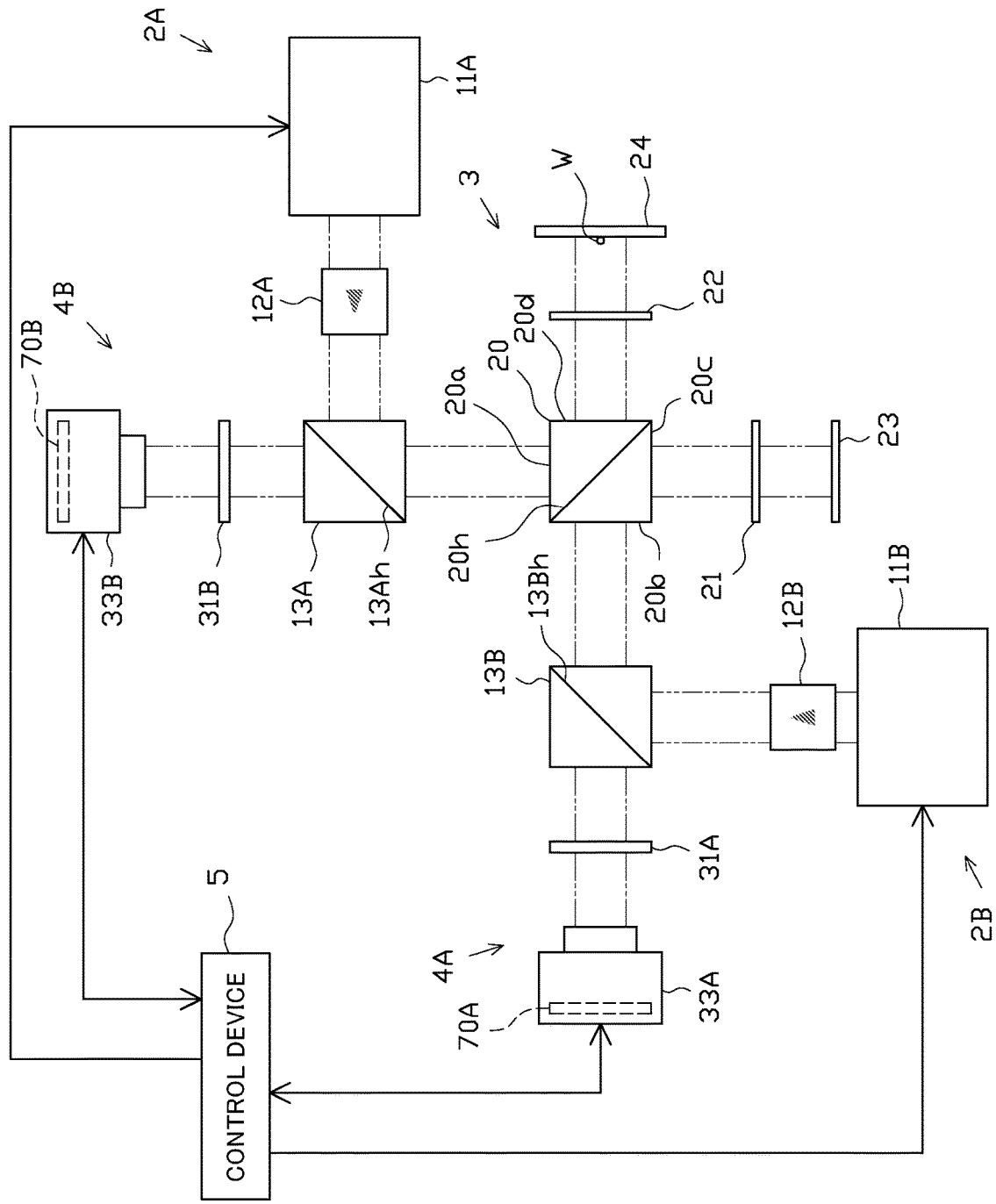
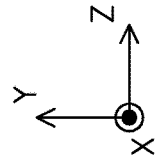

THREE-DIMENSIONAL MEASUREMENT DEVICE

BACKGROUND

Technical Field

The present disclosure relates to a three-dimensional measurement device configured to measure the shape of an object to be measured or a measurement object.

Description of Related Art

Three-dimensional measurement devices using an interferometer have conventionally been known. One of them is a three-dimensional measurement device configured to measure the three-dimensional shape of a measurement object by using the phase shift method.

The three-dimensional measurement device using the interferometer generally has a predetermined optical system including a polarizing beam splitter and the like; a light source configured to emit coherent light that is to enter the optical system; and an imaging device configured to take an image of light emitted from the predetermined optical system.

In this three-dimensional measurement device, the predetermined optical system splits the coherent light entering therein in two directions, causes a measurement object to be irradiated with one of the two split lights as object light while causing a reference plane to be irradiated with the other of the two split lights as reference light, and then recombines the object light and the reference light with each other to be emitted from the predetermined optical system. The reference light and the object light emitted from the predetermined optical system are made to interfere with each other, and images of the interfering lights are taken by the imaging device. Three-dimensional measurement of the measurement object is then performed by the phase shift method, based on the obtained luminance image data.

For example, a method of rotating a polarizing plate, which is used to cause the reference light and the object light emitted from the predetermined optical system to interfere with each other, and thereby changing the angle of a transmission axis of the polarizing plate or a method of changing the position of the reference plane that is to be irradiated with the reference light, in an optical axis direction have conventionally been used as the phase shift method of changing the phase difference between the reference light and the object light.

The conventional methods accordingly need to change the phase difference between the reference light and the object light in four different stages (or in three different stages) and to take images of the reference light and the object light having different phase differences at different timings in the process of three-dimensional measurement by using the phase shift method. Accordingly, an imaging time of a total of four operations (or three operations) is required to obtain four different (or three different) luminance image data.

With a view to shortening the time period required for obtaining data, a recently proposed configuration of a measurement device splits light (reference light and object light) emitted from a predetermined optical system into four lights, causes the reference light and object light of each of the four split lights to interfere with each other, and individually and simultaneously takes images of the interfering lights by using four cameras (as described in, for example, Patent Literature 1).

In this measurement device, wave plates of different characteristics are placed on respective optical paths of three other split lights but a reference split light out of the four split lights, so as to shift the phase of the reference light with regard to each of the three other split lights by a predetermined amount. This configuration accordingly generates phase differences between the reference light and the object light with regard to the four split lights, which differ by 90 degrees each.

In order to perform three-dimensional measurement by using the phase shift method more accurately, it is necessary to perform the phase shift more accurately. In the configuration of Patent Literature 1, however, there may be a variation in phase shift amount due to manufacturing errors, placing errors and the like of the respective wave plates.

The configuration of Patent Literature 1 obtains in advance phase shift errors by the respective wave plates placed on the optical paths of the three other split lights relative to the reference split light that passes through an optical path without any wave plate, and performs correction in the measurement process, based on the obtained phase shift errors.

PATENT LITERATURE

Patent Literature 1: Japanese Patent No. 5289383B

The configuration of using a plurality of cameras to individually take images of a plurality of split lights (interfering lights of reference light and object light) as in the case of Patent Literature 1, however, a measurement error may arise due to, for example, intrinsic differences in characteristics of lenses and imaging elements of the respective cameras.

By taking into account the foregoing, for example, one available configuration may use a polarization image sensor where multiple different types of polarizers having different set angles of transmission axes, each allowing for transmission of only a predetermined polarized light vibrating in a predetermined direction (for example, four different types of polarizers having set angles of "0 degree", "45 degrees", "90 degrees", and "135 degrees" of transmission axes relative to a reference axis) are arranged in a predetermined array to be one-to-one mapping to respective pixels (respective light-receiving elements), as the imaging element of the camera. This enables four different luminance data required for calculation by the phase shift method to be obtained simultaneously by one single imaging operation using one single camera.

In this configuration, however, when an actual angle (absolute angle) of the transmission axis in each of the polarizers of the polarization image sensor is even slightly deviated from an original set angle due to a manufacturing error and the like, a phase shift error occurs and prevents accurate luminance data from being obtained. This may lower the measurement accuracy.

The configuration using the polarization image sensor accordingly needs to correct the phase shift error, like Patent Literature 1. The polarization image sensor, however, has respective polarizers that are fixed to be not relatively displaceable and is thus not allowed to individually regulate the angle of the transmission axis of each polarizer.

In the polarization image sensor, even an identical type of polarizers having an identical original set angle (for example, polarizers having an identical set angle of "0 degree") have a variation among pixels due to a manufacturing error and the like and have different absolute angles of the transmission axes (for example, set angle of "0 degree"±error). In other words, there is no optical path usable as an absolute reference in the polarization image sensor.

Accordingly, the method of obtaining the phase shift error in the other optical paths relative to an optical path without any phase shift (optical path having a phase shift amount of "0 degree") as the reference and performing correction as described in Patent Literature 1 is not applicable.

The following describes the case of application of the conventional correction method described in Patent Literature 1 to the configuration using the polarization image sensor, in detail with reference to a concrete example shown in FIG. 10. FIG. 10 is a schematic diagram illustrating closeup of part of a polarization image sensor 100 where four different types of polarizers having different set angles of transmission axes (for example, set angles of α="0 degree", β="45 degrees", γ="90 degrees", and δ="135 degrees") are arranged in a predetermined array.

For example, height measurement based on luminance data obtained from four pixels, i.e., a "second pixel position", a "third pixel position", a "sixth pixel position", and a "seventh pixel position" of the polarization image sensor 100 (shown by a thick broken line area in FIG. 10) uses an absolute angle "$\alpha_6$" of the transmission axis of the polarizer at the "sixth pixel position", as well as a relative angle "$\beta_2$'(=$\beta_2-\alpha_6$)" of the transmission axis of the polarizer at the "second pixel position", a relative angle "$\gamma_3$' (=$\gamma_3-\alpha_6$)" of the transmission axis of the polarizer at the "third pixel position" and a relative angle "$\delta_7$' (=$\delta_7-\alpha_6$)" of the transmission axis of the polarizer at the "seventh pixel position" relative to the above absolute angle.

In this example, "$\beta_2$" denotes an "absolute angle of the transmission axis of the polarizer at the second pixel position"; "$\gamma_3$" denotes an "absolute angle of the transmission axis of the polarizer at the third pixel position"; and "$\delta_7$" denotes an absolute angle of the transmission axis of the polarizer at the seventh pixel position".

In another example, height measurement based on luminance data obtained from four pixels, i.e., a "third pixel position", a "fourth pixel position", a "seventh pixel position", and an "eighth pixel position" of the polarization image sensor 100 (shown by a thick solid line area in FIG. 10) uses an absolute angle "$\alpha_8$" of the transmission axis of the polarizer at the "eighth pixel position", as well as a relative angle "$\beta_4$' (=$\beta_4-\alpha_8$)" of the transmission axis of the polarizer at the "fourth pixel position", a relative angle "$\gamma_3$' (=$\gamma_3-\alpha_8$)" of the transmission axis of the polarizer at the "third pixel position" and a relative angle "$\delta_7$' (=$\delta_7-\alpha_8$)" of the transmission axis of the polarizer at the "seventh pixel position" relative to the above absolute angle.

In this example, "$\beta_4$" denotes an "absolute angle of the transmission axis of the polarizer at the fourth pixel position"; "$\gamma_3$" denotes an "absolute angle of the transmission axis of the polarizer at the third pixel position"; and "$\delta_7$" denotes an absolute angle of the transmission axis of the polarizer at the seventh pixel position".

As understood from comparison between the two cases described above, when the absolute angle "$\alpha_6$ (set angle α±an error $a_6$)" of the transmission axis of the polarizer at the "sixth pixel position" is different from the absolute angle "$\alpha_8$ (set angle α±an error $a_8$)" of the transmission axis of the polarizer at the "eighth pixel position", the transmission axis of the polarizer at the "third pixel position" has different relative angles "$\gamma_3$" and the transmission axis of the polarizer at the "seventh pixel position" has different relative angles "$\delta_7$", irrespective of the identical pixel and the identical polarizer. Such differences of the relative angles also provide different correction values.

This means that each shift in the measurement position (four luminance data as an object of calculation) provides a different reference and needs to change correction values. Furthermore, this method needs to provide a plurality of correction values with regard to one identical pixel. The imaging element (polarization image sensor) used in three-dimensional measurement generally has an extremely large number of pixels. The method described above is thus likely to remarkably complicate the measurement process and to extremely increase the processing load.

Furthermore, in a configuration that does not perform a calibration for adjustment of relative errors between a plurality of pixels in the imaging element as in the case of Patent Literature 1, three-dimensional measurement of, for example, a reference plate having an identical height plane is likely to give calculation results of different height data at respective measurement positions and provide a measurement result of a concavo-convex object having uneven heights.

SUMMARY

By taking into account the circumstances described above, one or more embodiments of the present disclosure provide a three-dimensional measurement device that achieves, for example, improvement of the measurement accuracy.

The following describes each of various aspects of the present disclosure. Functions and advantageous effects that are characteristic of each of the aspects are also described as appropriate.

Aspect 1. There is provided a three-dimensional measurement device, comprising: a predetermined optical system (a specific optical system) configured to split a predetermined incident light into two lights, to irradiate a measurement object with one of the two lights as an object light and irradiate a reference plane with the other of the two lights as a reference light, and to recombine the object light and the reference light with each other and emit a combined light; an irradiation unit (i.e., a light emitter) configured to emit the predetermined light that enters the predetermined optical system; an imaging unit (i.e., an imaging device) configured to take an image of a light emitted from the predetermined optical system, wherein the imaging unit has an imaging element (a polarization image sensor) comprising a plurality of light-receiving elements and multiple different types of polarizers, which have different set angles of transmission axes and which are arranged in a predetermined array to be one-to-one mapping to (to have one-to-one correspondence with) the respective light-receiving elements (for example, four different types of polarizers having set angles of "0 degree", "45 degrees", "90 degrees", and "135 degrees" of transmission axes); an angle data storage unit (i.e., a storage device) configured to store transmission axis absolute angle data obtained by a previous actual measurement of an absolute angle of a transmission axis of the polarizer with regard to each light-receiving element in the imaging element; and an image processing unit (i.e., a control device) configured to calculate a phase difference between the reference light and the object light with regard to a predetermined measurement position of the measurement object by a phase shift method, based on a piece of luminance data of each pixel in luminance image data obtained by the imaging unit and a piece of the transmission axis absolute angle data of the polarizer with regard to a light-receiving element of the imaging element corresponding to the pixel and to perform height measurement (measure a height of the measurement object) at the measurement position.

The "absolute angle of the transmission axis of the polarizer" described above may be obtained as a "deviation amount relative to the set angle of the transmission axis of the polarizer (for example, a set angle of "45 degrees"+an error of "1 degree")".

The configuration of above Aspect 1 uses the polarization image sensor where multiple different types of polarizers having different set angles of transmission axes, each allowing only a predetermined polarized light vibrating in a predetermined direction to be transmitted, are arranged in a predetermined array to be one-to-one mapping to the respective light-receiving elements, as the imaging element of the imaging unit. This configuration enables multiple different luminance data required for the height measurement by the phase shift method with regard to a predetermined measurement position of the measurement object to be obtained simultaneously by one single imaging operation using one single imaging unit. As a result, this, for example, simplifies the configuration and shortens the time period required for obtaining data, compared with a configuration using a plurality of imaging units or a configuration performing a plurality of imaging operations.

In a configuration of respectively using wave plates of different characteristics for a plurality of split lights, as the phase shift unit of proving multiple different phase differences between the reference light and the object light, for example, as in the case of Patent Literature 1, a phase shift error is likely to occur by not only manufacturing errors of the respective wave plates but expansion and contraction of the respective wave plates due to a temperature change. It is thus very difficult to accurate correct the phase shift error.

The configuration of this aspect, on the other hand, uses multiple different types of polarizers having different set angles of transmission axes, as the phase shift unit. Compared with the configuration of performing phase shift by using the wave plates, this configuration is unlikely to be affected by a temperature change in the process of the phase shift, error correction thereof and the like and is thus unlikely to cause the trouble described above. As a result, this configuration achieves, for example, improvement of the measurement accuracy.

Furthermore, the configuration of this aspect does not use the set angles of the transmission axes but uses the transmission axis absolute angle data that are the actual values obtained by a previous actual measurement, as the angle data of the transmission axes of the polarizers used for calculation of the phase difference between the reference light and the object light by the phase shift method. This configuration enables the phase difference to be determined more accurately. As a result, this achieves, for example, the further improvement of the measurement accuracy.

Moreover, the configuration of this aspect neither needs to use a common reference that is to be shared by all the measurement positions nor needs to regulate relative errors between a plurality of pixels relating to the phase shift. This configuration also does not need to provide a plurality of correction values with regard to one identical pixel and to change a correction value to be used according to each shift in the measurement position.

Additionally, in the configuration of moving a predetermined optical element and performing predetermined error regulation or the like as in the case of Patent Literature 1, there may be an additional error caused by such operation.

The configuration of this aspect, on the other hand, performs the error regulation by the software processing without moving any of various optical elements. As a result, this configuration achieves, for example, further improvement of the measurement accuracy.

Aspect 2. There is provided a three-dimensional measurement device, comprising: a polarizing beam splitter configured to split a predetermined incident light into two polarized lights that have polarizing directions perpendicular to each other, to irradiate a measurement object with one of the two polarized lights as an object light and irradiate a reference plane with the other of the two polarized lights as a reference light, and to recombine the object light and the reference light with each other and emit a combined light; an irradiation unit (i.e., a light emitter) configured to emit the predetermined light that enters a first face of the polarizing beam splitter; an imaging unit (i.e., an imaging device) configured to take an image of a light emitted from a second face of the polarizing beam splitter, wherein the imaging unit has an imaging element (a polarization image sensor) comprising a plurality of light-receiving elements and multiple different types of polarizers, which have different set angles of transmission axes and which are arranged in a predetermined array to be one-to-one mapping to (to have one-to-one correspondence with) the respective light-receiving elements (for example, four different types of polarizers having set angles of "0 degree", "45 degrees", "90 degrees", and "135 degrees" of transmission axes); a first quarter-wave plate placed between a third face of the polarizing beam splitter which the reference light enters and the reference light is emitted from, and the reference plane; a second quarter-wave plate placed between a fourth face of the polarizing beam splitter which the object light enters and the object light is emitted from, and the measurement object; a third quarter-wave plate placed between the second face of the polarizing beam splitter and the imaging unit; an angle data storage unit (i.e., a storage device) configured to store transmission axis absolute angle data obtained by a previous actual measurement of an absolute angle of a transmission axis of the polarizer with regard to each light-receiving element in the imaging element; and an image processing unit (i.e., a control device) configured to calculate a phase difference between the reference light and the object light with regard to a predetermined measurement position of the measurement object by a phase shift method, based on a piece of luminance data of each pixel in luminance image data obtained by the imaging unit and a piece of the transmission axis absolute angle data of the polarizer with regard to a light-receiving element of the imaging element corresponding to the pixel and to perform height measurement (measure a height of the measurement object) at the measurement position.

The configuration of above Aspect 2 has similar functions and advantageous effects to those of the configuration of above Aspect 1.

The "polarizing beam splitter" serves to transmit a first polarized light (for example, P-polarized light) having a first polarizing direction through a boundary surface thereof and to reflect a second polarized light (for example, S-polarized light) having a second polarizing direction from the boundary surface thereof.

Accordingly, the predetermined light entering the first face of the polarizing beam splitter is split into the reference light that is, for example, the first polarized light, and the object light that is, for example, the second polarized light. Furthermore, the reference light that is, for example, the second polarized light entering the third face of the polarizing beam splitter, and the object light that is, for example, the first polarized light entering the fourth face of the polarizing beam splitter, are combined with each other to be emitted from the second face of the polarizing beam splitter.

The "first quarter-wave plate" serves to convert linearly polarized light into circularly polarized light and to convert circularly polarized light into linearly polarized light. Accordingly, the linearly polarized light (reference light) emitted from the third face of the polarizing beam splitter is converted into circularly polarized light via the "first quarter-wave plate", and the reference plane is irradiated with this converted circularly polarized light. The reference light reflected from the reference plane is again converted from the circularly polarized light into linearly polarized light via the "first quarter-wave plate" and enters the third face of the polarizing beam splitter.

The "second quarter-wave plate" serves to convert linearly polarized light into circularly polarized light and to convert circularly polarized light into linearly polarized light. Accordingly, the linearly polarized light (object light) emitted from the fourth face of the polarizing beam splitter is converted into circularly polarized light via the "second quarter-wave plate", and the measurement object is irradiated with this converted circularly polarized light. The object light reflected from the measurement object is again converted from the circularly polarized light into linearly polarized light via the "second quarter-wave plate" and enters the fourth face of the polarizing beam splitter.

The "third quarter-wave plate" serves to convert each of linearly polarized light of a reference light component and linearly polarized light of an object light component emitted from the second face of the polarizing beam splitter, into circularly polarized light.

Aspect 3. In the three-dimensional measurement device described in either of above Aspect 1 or above Aspect 2, when the measurement position is a predetermined position with regard to a plurality of pixels (for example, four adjacent pixels arrayed in a two-by-two matrix or aligned three pixels) in the luminance image data, the image processing unit may be configured to perform the height measurement at the measurement position, based on pieces of the luminance data of part or all of the plurality of pixels (for example, predetermined three pixels out of the four pixels or all the four pixels) and pieces of the transmission axis absolute angle data of the polarizers respectively corresponding to the part or all of the plurality of pixels.

The configuration of above Aspect 3 enables height measurement to be performed relatively easily with regard to one measurement position. As a result, this relieves the processing load and shortens the measurement time.

Aspect 4. In the three-dimensional measurement device described in either of above Aspect 1 or above Aspect 2, when the measurement position is a predetermined position corresponding to one pixel in the luminance image data, the image processing unit may be configured to perform: a luminance data interpolation process of interpolating another piece of the luminance data other than the piece of the luminance data with regard to the one pixel obtained by the imaging unit, out of a plurality of pieces of (for example, three or four) luminance data required for the height measurement at the measurement position; and an angle data interpolation process of interpolating another piece of the transmission axis absolute angle data other than the piece of the transmission axis absolute angle data with regard to the one pixel stored in the angle data storage unit, out of a plurality of pieces of (for example, three or four) transmission axis absolute angle data required for the height measurement at the measurement position, and the image processing unit may be configured to perform the height measurement at the measurement position, based on the plurality of pieces of (for example, three or four) luminance data and the plurality of pieces of (for example, three or four) transmission axis absolute angle data with regard to the measurement position including the interpolated luminance data and the interpolated transmission axis absolute angle data.

The configuration of above Aspect 4 reduces the occurrence of such a trouble that there is a data missing part at a measurement position that is a predetermined position corresponding to one pixel of the luminance image data. Moreover, this configuration performs interpolation of both the luminance data and the transmission axis absolute angle data, thus enhancing the measurement accuracy. The method employable for the interpolation process of various data may be linear interpolation or any of various other interpolation techniques.

Aspect 5. In the three-dimensional measurement device described in any of above Aspects 1 to 4, by using four pieces of the luminance data and four pieces of the transmission axis absolute angle data respectively corresponding to the four pieces of the luminance data for the height measurement at the measurement position, the phase difference with regard to the measurement position may be calculated by Expression (S1) given below, where the four pieces of the luminance data are respectively expressed by $I\alpha$, $I\beta$, $I\gamma$, and $I\delta$ and the four pieces of the transmission axis absolute angle data are respectively expressed by $\alpha$, $\beta$, $\gamma$, and $\delta$:

[Math. 1]

$$\phi = \tan^{-1} \frac{-(l_\beta - l_\delta)(\sin 2\alpha - \sin 2\gamma) + (l_\alpha - l_\gamma)(\sin 2\beta - \sin 2\delta)}{(l_\beta - l_\delta)(\cos 2\alpha - \cos 2\gamma) - (l_\alpha - l_\gamma)(\cos 2\beta - \cos 2\delta)} \quad (S1)$$

where $I\alpha$ denotes a first piece of the luminance data, $I\beta$ denotes a second piece of the luminance data, $I\gamma$ denotes a third piece of the luminance data, $I\delta$ denotes a fourth piece of the luminance data, $\alpha$ denotes a first piece of the transmission axis absolute angle data, $\beta$ denotes a second piece of the transmission axis absolute angle data, $\gamma$ denotes a third piece of the transmission axis absolute angle data, $\delta$ denotes a fourth piece of the transmission axis absolute angle data, and $\phi$ denotes the phase difference between the reference light and the object light.

The configuration of above Aspect 5 allows for height measurement with the higher accuracy, compared with a configuration of performing height measurement by the phase shift method based on three luminance data and three transmission axis absolute angle data of the polarizers.

Aspect 6. In the three-dimensional measurement device described in any of above Aspects 1 to 4, by using three pieces of the luminance data and three pieces of the transmission axis absolute angle data respectively corresponding to the three pieces of the luminance data for the height measurement at the measurement position, the phase difference with regard to the measurement position may be calculated by Expression (S2) given below, where the three pieces of the luminance data are respectively expressed by $I\alpha$, $I\beta$ and $I\gamma$ and the three pieces of the transmission axis absolute angle data are respectively expressed by $\alpha$, $\beta$ and $\gamma$:

[Math. 2]

$$\phi = \tan^{-1}\frac{-(I_\beta - I_\gamma)(\sin 2\alpha - \sin 2\gamma) + (I_\alpha - I_\gamma)(\sin 2\beta - \sin 2\gamma)}{(I_\beta - I_\gamma)(\cos 2\alpha - \cos 2\gamma) - (I_\alpha - I_\gamma)(\cos 2\beta - \cos 2\gamma)} \quad (S2)$$

where Iα denotes a first piece of the luminance data, Iβ denotes a second piece of the luminance data, Iγ denotes a third piece of the luminance data, α denotes a first piece of the transmission axis absolute angle data, β denotes a second piece of the transmission axis absolute angle data, γ denotes a third piece of the transmission axis absolute angle data, and ϕ denotes the phase difference between the reference light and the object light.

The configuration of above Aspect 6 reduces the time and the labor required for measurement, compared with a configuration of performing height measurement by the phase shift method based on four luminance data and four transmission axis absolute angle data of the polarizers.

BRIEF DESCRIPTION OF DRAWINGS

FIG. 1 is a schematic configuration diagram illustrating a three-dimensional measurement device;

DETAILED DESCRIPTION OF EMBODIMENTS

First Embodiment

Figure 2:
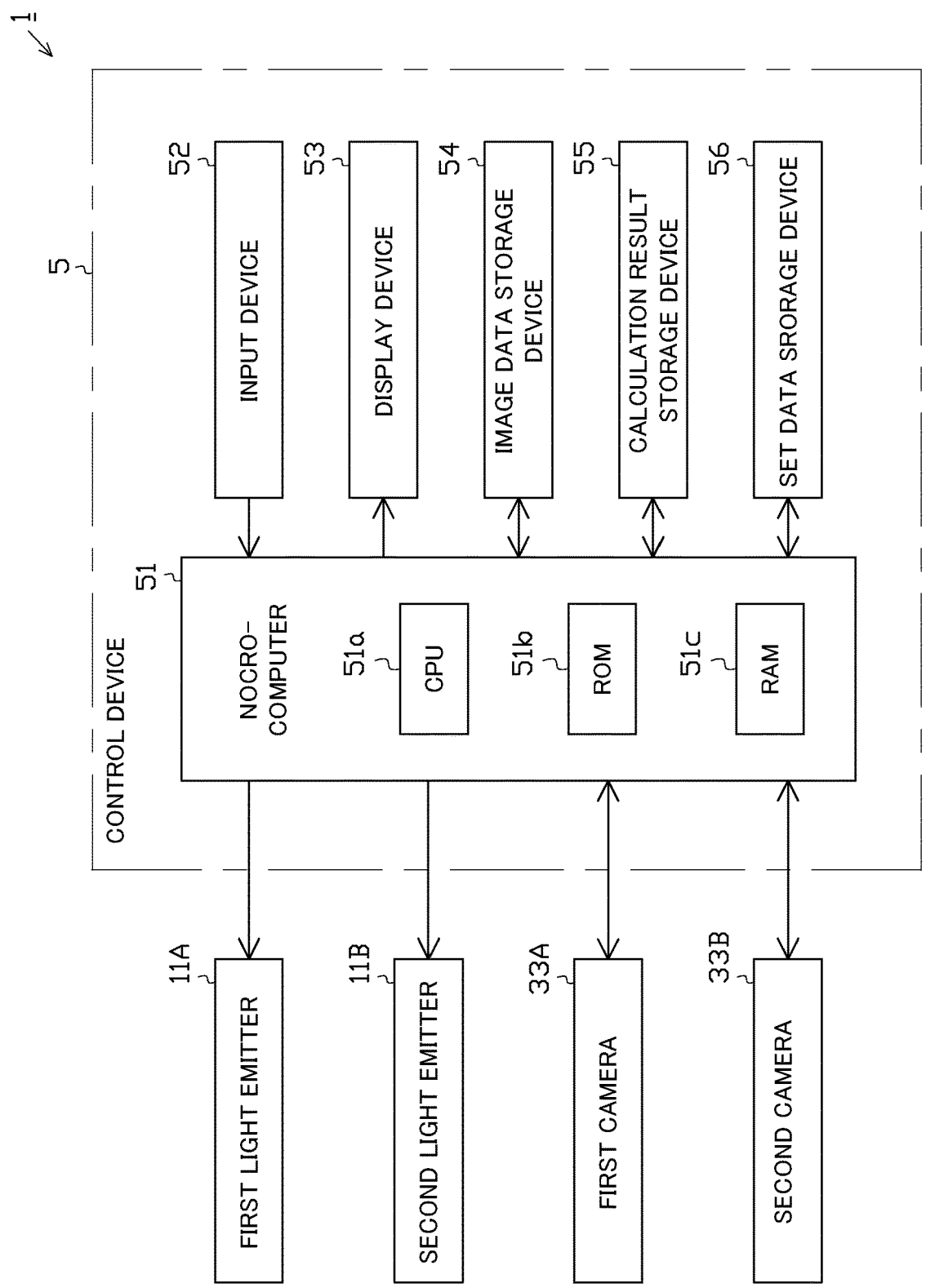
FIG. 2 is a block diagram illustrating the electrical configuration of the three-dimensional measurement device.

The following describes a first embodiment of the three-dimensional measurement device with reference to drawings. FIG. 1 is a schematic diagram illustrating the general configuration of a three-dimensional measurement device 1 according to this embodiment. FIG. 2 is a block diagram illustrating the electrical configuration of the three-dimensional measurement device 1. In the description below, for the purpose of convenience, a front-back direction on a sheet surface of FIG. 1 is called an "X-axis direction", a vertical direction on the sheet surface is called a "Y-axis direction", and a horizontal direction on the sheet surface is called a "Z-axis direction".

The three-dimensional measurement device 1 is configured on the principle of a Michelson interferometer and includes two projection optical systems 2A and 2B (first projection optical system 2A and second projection optical system 2B) configured to output lights of specific wavelengths; an interference optical system 3 configured to receive incident lights respectively emitted from the projection optical systems 2A and 2B; two imaging systems 4A and 4B (first imaging system 4A and second imaging system 4B) configured to take images of the light emitted from the interference optical system 3; and a control device 5 configured to perform various controls, image processing, arithmetic operations, and the like relating to, for example, the projection optical systems 2A and 2B, the interference optical system 3 and the imaging systems 4A and 4B.

The "control device 5" configures the "image processing unit" according to the embodiment, and the "interference optical system 3" configures the "predetermined optical system (specific optical system)" according to the embodiment. In the description of the embodiment, an optical system that splits predetermined incident light into two split lights (object light and reference light), makes an optical path difference between the two split lights, recombines the split lights, and outputs the recombined light for the purpose of causing interference of light (taking an image of interfering light) is called the "interference optical system". In other words, an optical system that outputs two lights in the form of combined light without interfering with each other inside thereof is also called the "interference optical system". In the case where two lights (object light and reference light) are output in the form of combined light from the "interference optical system" without interfering with each other like this embodiment, the combined light is converted into interfering light via a predetermined interference unit at least in a previous stage prior to imaging as described later.

The following first describes the configuration of the two projection optical systems 2A and 2B (the first projection optical system 2A and the second projection optical system 2B) in detail. The first projection optical system 2A includes, for example, a first light emitter 11A, a first light isolator 12A and a first non-polarizing beam splitter 13A.

Although not being specifically illustrated, the first light emitter 11A that configures the irradiation unit includes, for example, a laser light source configured to output linearly polarized light having a specific wavelength $\lambda_1$, a beam expander configured to expand the linearly polarized light output from the laser light source and output the expanded linearly polarized light as parallel light, a polarizing plate configured to adjust the intensity, and a half-wave plate configured to adjust the polarizing direction.

According to the embodiment under the above configuration, linearly polarized light that is polarized in a direction inclined at an angle of 45 degrees to the X-axis direction and the Y-axis direction as a polarizing direction and that has a wavelength $\lambda_1$ (for example, $\lambda_1$=1500 nm) is emitted leftward in the Z-axis direction from the first light emitter 11A. In the description below, the light that is emitted from the first light emitter 11A and that has the wavelength $\lambda_1$ is called "first light".

The first light isolator 12A is an optical element that causes only light traveling in one direction (leftward in the Z-axis direction according to the embodiment) to be transmitted, while blocking light traveling in an opposite direction (rightward in the Z-axis direction according to the embodiment). This configuration allows for transmission of only the first light emitted from the first light emitter 11A and prevents the first light emitter 11A from being damaged, destabilized or the like by return light.

The first non-polarizing beam splitter 13A is a known cube-shaped optical member obtained by joining right-angle prisms (triangular prisms respectively having isosceles right triangular bottom faces: The same applies to the description hereafter) with each other to be integrated, and has a joint surface 13Ah coated with, for example, a metal film.

The non-polarizing beam splitter serves to split incident light including a polarization state thereof into transmitted light and reflected light at a predetermined ratio. The same applies to the description hereafter. According to the embodiment, a so-called half mirror having a split ratio of 1:1 is employed. The non-polarizing beam splitter accordingly splits the incident light into a P-polarized light component and an S-polarized light component of transmitted light and a P-polarized light component and an S-polarized light component of reflected light all at identical rates, with keeping the respective polarization states of the transmitted light and the reflected light identical with the polarization state of the incident light.

In the embodiment, linearly polarized light that is polarized in a direction parallel to the sheet surface of FIG. 1 (the Y-axis direction or the Z-axis direction) as the polarizing direction is called P-polarized light (P-polarized light component), and linearly polarized light that is polarized in the X-axis direction perpendicular to the sheet surface of FIG. 1 as the polarizing direction is called S-polarized light (S-polarized light component).

The first non-polarizing beam splitter 13A is arranged such that one of two adjacent faces across the joint surface 13Ah thereof is perpendicular to the Y-axis direction and the other of the two adjacent faces is perpendicular to the Z-axis direction. In other words, the joint surface 13Ah of the first non-polarizing beam splitter 13A is arranged to be inclined at an angle of 45 degrees to the Y-axis direction and the Z-axis direction. More specifically, the first non-polarizing beam splitter 13A is arranged such as to cause part (half) of the first light entering leftward in the Z-axis direction from the first light emitter 11A via the first light isolator 12A to be transmitted leftward in the Z-axis direction and such as to cause the remaining part (the remaining half) of the first light to be reflected downward in the Y-axis direction.

Like the first projection optical system 2A described above, the second projection optical system 2B includes, for example, a second light emitter 11B, a second light isolator 12B and a second non-polarizing beam splitter 13B.

Like the first light emitter 11A described above, the second light emitter 11B that configures the irradiation unit includes, for example, a laser light source configured to output linearly polarized light having a specific wavelength $\lambda_2$, a beam expander configured to expand the linearly polarized light output from the laser light source and output the expanded linearly polarized light as parallel light, a polarizing plate configured to adjust the intensity, and a half-wave plate configured to adjust the polarizing direction.

According to the embodiment under the above configuration, linearly polarized light that is polarized in a direction inclined at an angle of 45 degrees to the X-axis direction and the Z-axis direction as the polarizing direction and that has a wavelength $\lambda_2$ (for example, $\lambda_2$=1503 nm) is emitted upward in the Y-axis direction from the second light emitter 11B. In the description below, the light that is emitted from the second light emitter 11B and that has the wavelength $\lambda_2$ is called "second light".

Like the first light isolator 12A, the second light isolator 12B is an optical element that causes only light traveling in one direction (upward in the Y-axis direction according to the embodiment) to be transmitted, while blocking light traveling in an opposite direction (downward in the Y-axis direction according to the embodiment). This configuration allows for transmission of only the second light emitted from the second light emitter 11B and prevents the second light emitter 11B from being damaged, destabilized or the like by return light.

Like the first non-polarizing beam splitter 13A, the second non-polarizing beam splitter 13B is a known cube-shaped optical member obtained by joining right-angle prisms with each other to be integrated, and has a joint surface 13Bh coated with, for example, a metal film.

The second non-polarizing beam splitter 13B is arranged such that one of two adjacent faces across the joint surface 13Bh thereof is perpendicular to the Y-axis direction and the other of the two adjacent faces is perpendicular to the Z-axis direction. In other words, the joint surface 13Bh of the second non-polarizing beam splitter 13B is arranged to be inclined at an angle of 45 degrees to the Y-axis direction and the Z-axis direction. More specifically, the second non-polarizing beam splitter 13B is arranged such as to cause part (half) of the second light entering upward in the Y-axis direction from the second light emitter 11B via the second light isolator 12B to be transmitted upward in the Y-axis direction and such as to cause the remaining part (the remaining half) of the second light to be reflected rightward in the Z-axis direction.

The following describes the configuration of the interference optical system 3 in detail. The interference optical system 3 includes, for example, a polarizing beam splitter (PBS) 20, quarter-wave plates 21 and 22, a reference plane 23 and a mounting portion 24.

The polarizing beam splitter 20 is a known cube-shaped optical member obtained by joining right-angle prisms with each other to be integrated, and has a joint surface (boundary face) 20h coated with, for example, a dielectric multi-layer film.

The polarizing beam splitter 20 serves to split linearly polarized incident light into two polarized light components (P-polarized light component and S-polarized light component) that have polarizing directions perpendicular to each other. The polarizing beam splitter 20 according to the embodiment is configured to cause the P-polarized light component to be transmitted and to cause the S-polarized light component to be reflected.

The polarizing beam splitter 20 is arranged such that one of two adjacent faces across the joint surface 20h thereof is perpendicular to the Y-axis direction and the other of the two adjacent faces is perpendicular to the Z-axis direction. In other words, the joint surface 20h of the polarizing beam splitter 20 is arranged to be inclined at an angle of 45 degrees to the Y-axis direction and the Z-axis direction.

More specifically, the polarizing beam splitter 20 is arranged such that a first face (Y-axis direction upper face) 20a of the polarizing beam splitter 20 which causes the first light reflected downward in the Y-axis direction to enter from the first non-polarizing beam splitter 13A described above and a third face (Y-axis direction lower face) 20c opposed to the first face 20a are perpendicular to the Y-axis direction.

The polarizing beam splitter 20 is, on the other hand, arranged such that a second face (Z-axis direction left side face) 20b of the polarizing beam splitter 20 which causes the second light reflected rightward in the Z-axis direction to enter from the second non-polarizing beam splitter 13B described above and a fourth face (Z-axis direction right side face) 20d opposed to the second face 20b are perpendicular to the Z-axis direction.

The quarter-wave plate 21 is arranged to be opposed in the Y-axis direction to the third face 20c of the polarizing beam splitter 20. The reference plane 23 is arranged to be opposed in the Y-axis direction to the quarter-wave plate 21.

The quarter-wave plate 21 serves to convert linearly polarized light into circularly polarized light and to convert circularly polarized light into linearly polarized light and configures the "first quarter-wave plate" according to the embodiment. Accordingly, the linearly polarized light (reference light) that is emitted from the third face 20c of the polarizing beam splitter 20 is converted into circularly polarized light via the quarter-wave plate 21 to irradiate the reference plane 23. The reference light reflected from the reference plane 23 is converted again from the circularly polarized light into linearly polarized light via the quarter-wave plate 21 and enters the third face 20c of the polarizing beam splitter 20.

The quarter-wave plate 22 is, on the other hand, arranged to be opposed in the Z-axis direction to the fourth face 20d of the polarizing beam splitter 20. The mounting portion 24 is arranged to be opposed in the Z-axis direction to the quarter-wave plate 22.

The quarter-wave plate 22 serves to convert linearly polarized light into circularly polarized light and to convert circularly polarized light into linearly polarized light and configures the "second quarter-wave plate" according to the embodiment. Accordingly, the linearly polarized light (object light) that is emitted from the fourth face 20d of the polarizing beam splitter 20 is converted into circularly polarized light via the quarter-wave plate 22 to irradiate the work W that is the object to be measured or the measurement object placed on the mounting portion 24. The object light reflected from the work W is converted again from the circularly polarized light into linearly polarized light via the quarter-wave plate 22 and enters the fourth face 20d of the polarizing beam splitter 20.

The following describes the configuration of the two imaging systems 4A and 4B (the first imaging system 4A and the second imaging system 4B) in detail.

The first imaging system 4A includes, for example, a quarter-wave plate 31A and a first camera 33A that configures the imaging unit (or the imaging device).

The quarter-wave plate 31A is configured to convert each linearly polarized light (the reference light component and the object light component of the first light) that is transmitted leftward in the Z-axis direction through the second non-polarizing beam splitter 13B into circularly polarized light and configures the "third quarter-wave plate" according to the embodiment.

The first camera 33A according to the embodiment is a polarization camera including a polarization image sensor 70A as an imaging element.

Figure 5:
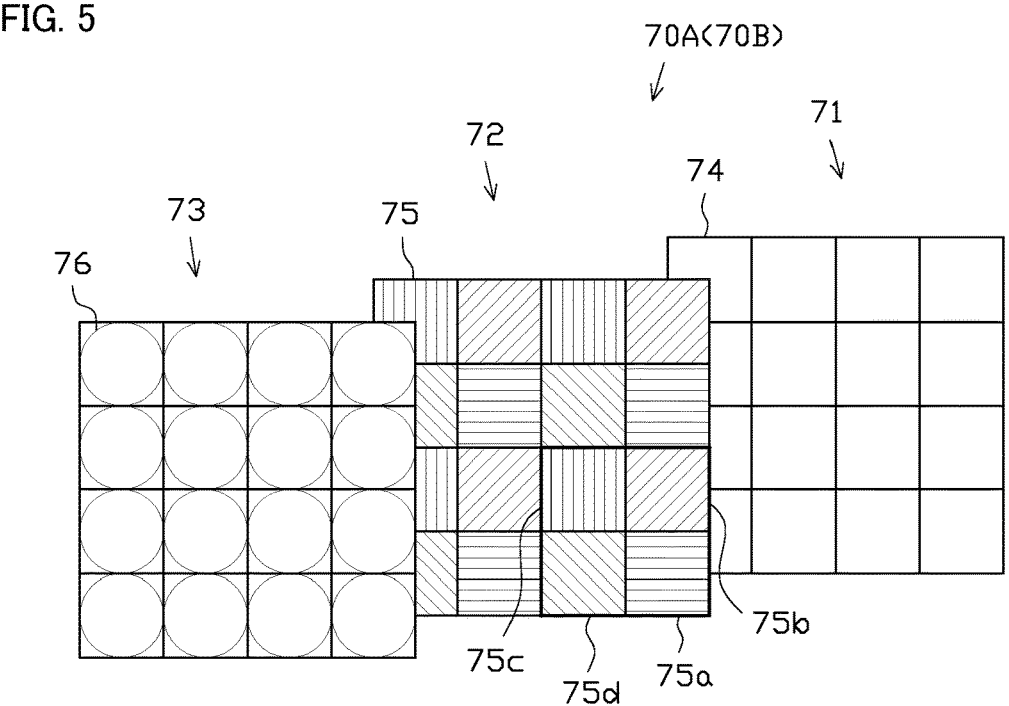
FIG. 5 is a schematic configuration diagram illustrating a polarization image sensor.

As shown in FIG. 5, the polarization image sensor 70A includes a light-receiving element array 71 serving as a sensor main body, a polarizer array 72 provided on a front face side that is a light-receiving face side of the light-receiving element array 71, and a microlens array 73 provided on a front face side of the polarizer array 72.

The light-receiving element array 71 has a semiconductor element structure of, for example, a general CCD image sensor and has a plurality of light-receiving elements (pixels) 74 that are two-dimensionally arrayed in a matrix form.

Figure 6:
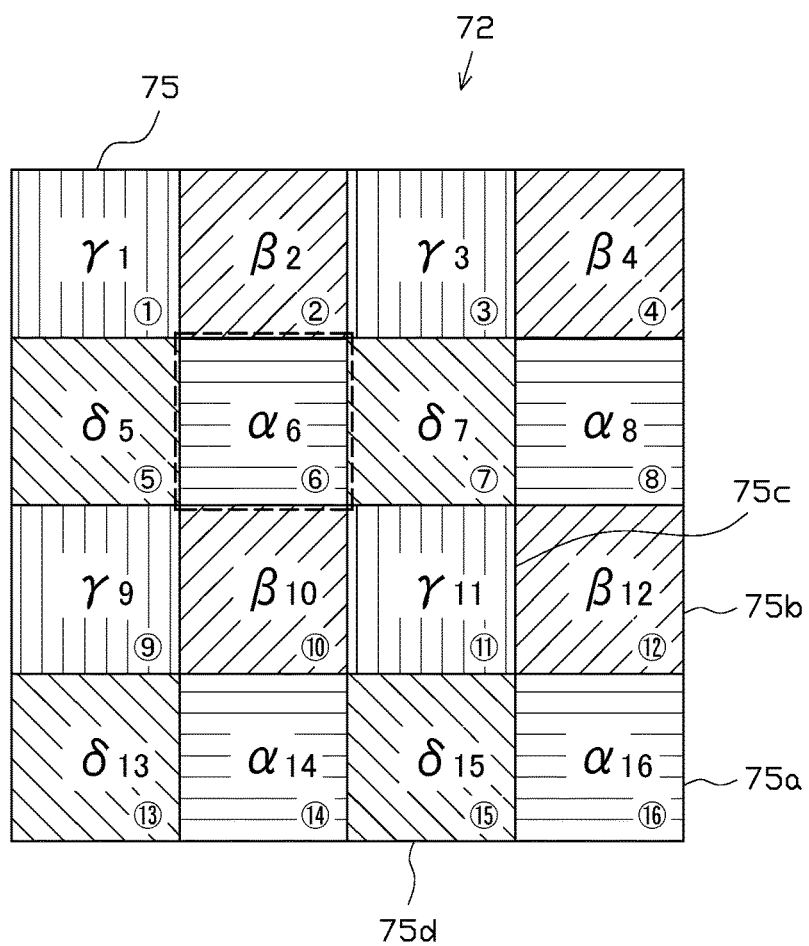
FIG. 6 is a schematic diagram illustrating the configuration of a polarizer array.

The actual light-receiving element array 71 is an array of a large number of pixels (for example, 1280×1024 pixels). For the purpose of simplification of the description, only a part thereof in four rows and four columns is illustrated in FIG. 5, FIG. 6 and other relevant drawings (the same applies to the polarizer array 72 and the microlens array 73).

The polarizer array 72 has a plurality of polarizers 75 that are two-dimensionally arrayed in a matrix form. Each of the polarizers 75 is provided to be one-to-one mapping to each of the light-receiving elements 74 of the light-receiving element array 71.

The polarizer 75 is configured to selectively transmit the reference light component and the object light component converted into the circularly polarized lights as described above. This configuration enables the reference light component and the object light component having different rotating directions to interfere with each other. This configuration also provides a predetermined phase difference between the reference light component and the object light component. Accordingly, each polarizer 75 configures the "phase shift unit" and the "interference unit" according to the embodiment.

The polarizers 75 include four different types of polarizers 75a, 75b, 75c and 75d that have different set angles α, β, γ, and δ of transmission axes differing by 45 degrees each at the time of manufacturing. More specifically, the polarizers 75 include first polarizers 75a set (manufactured) to have the set angle α="0 degree" of the transmission axis relative to a reference line (horizontal line), second polarizers 75b set to have the set angle β="45 degrees" of the transmission axis, third polarizers 75c set to have the set angle γ="90 degrees" of the transmission axis and fourth polarizers 75d set to have the set angle δ="135 degrees" of the transmission axis.

This configuration enables the reference light component and the object light component of the light transmitted through each of the polarizers 75 of the polarizer array 72 to interfere with each other in four different phase differences. Accordingly, this configuration generates four different interfering lights that have phase differences between the reference light and the object light differing by 90 degrees each.

Concrete settings are designed to give a phase shift amount of "0 degree" with regard to the reference light component of the light transmitted through the first polarizers 75a, a phase shift amount of "90 degrees" with regard to the reference light component of the light transmitted through the second polarizers 75b, a phase shift amount of "180 degrees" with regard to the reference light component of the light transmitted through the third polarizers 75c and a phase shift amount of "270 degrees" with regard to the reference light component of the light transmitted through the fourth polarizers 75d.

The polarizer array 72 is configured such that a specific polarizer array pattern (shown as a thick frame part in FIG. 5), where these four different polarizers 75a, 75b, 75c and 75d having the different angles of the transmission axes are arrayed in a predetermined sequence in a 2×2 matrix, is repeated in matrix.

The polarizer array pattern according to the embodiment is configured to include the first polarizer 75a located at a lower right position, the second polarizer 75b located at an upper right position, the third polarizer 75c located at an upper left position and the fourth polarizer 75d located at a lower left position, in a front view of the polarizer array 72.

When four polarizers 75 arrayed in a 2×2 matrix is extracted from any position in the polarizer array 72, the extracted array certainly includes respective ones of the four different polarizers 75a, 75b, 75c and 75d having different angles of transmission axes.

The actual transmission axis angle (absolute angle) of each polarizer 75 is not strictly equal to the set angle α="0 degree", β="45 degrees", γ="90 degrees" or δ="135 degrees" but includes a small error due to a manufacturing error.

For example, like an example illustrated in FIG. 6, a transmission axis absolute angle $α_6$ (0 degree±error $a_6$) of the first polarizer 75a at a sixth pixel position, a transmission axis absolute angle $α_8$ (0 degree±error $a_8$) of the first polarizer 75a at an eighth pixel position, a transmission axis absolute angle $α_{14}$ (0 degree±error $a_{14}$) of the first polarizer 75a at a fourteenth pixel position and a transmission axis absolute angle $α_{16}$ (0 degree±error $a_{16}$) of the first polarizer 75a at a sixteenth pixel position, which are expected to have an identical set angle "0 degree" of the transmission axis, however, have different values in a strict sense.

Accordingly, the configuration of the embodiment performs a calibration to obtain these errors in advance in a previous stage of three-dimensional measurement. The details of this calibration will be described later.

The microlens array 73 has a plurality of microlenses 76 that are two-dimensionally arrayed in a matrix form. Each of the microlenses 76 serves to enhance the light collecting efficiency of each pixel and is provided to be one-to-one mapping to each of the polarizers 75 in the polarizer array 72.

The light collected by each of the microlenses 76 in the microlens array 73 passes through each corresponding polarizer 75 in the polarizer array 72. This provides each predetermined phase difference between each reference light component and each object light component thereof to give an interfering light and causes the interfering light to be received by each corresponding light-receiving element 74 in the light-receiving array 71.

Luminance image data taken and obtained by the first camera 33A is converted into a digital signal inside of the first camera 33A and is input in the form of the digital signal into the control device 5 (an image data storage device 54).

Like the first imaging system 4A, the second imaging system 4B includes, for example, a quarter-wave plate 31B and a second camera 33B that configures the imaging unit (or the imaging device).

The quarter-wave plate 31B is configured to convert each linearly polarized light (the reference light component and the object light component of the second light) that is transmitted upward in the Y-axis direction through the first non-polarizing beam splitter 13A into circularly polarized light and configures the "third quarter-wave plate" according to the embodiment.

Like the first camera 33A, the second camera 33B is a polarization camera including a polarization image sensor 70B as an imaging element. The polarization image sensor 70B has a similar configuration to the configuration of the polarization image sensor 70A of the first camera 33A and is not described in detail.

As in the first camera 33A, luminance image data taken and obtained by the second camera 33B is converted into a digital signal inside of the second camera 33B and is input in the form of the digital signal into the control device 5 (the image data storage device 54).

The following describes the electrical configuration of the control device 5. As shown in FIG. 2, the control device 5 includes a microcomputer 51 configured to control the entire three-dimensional measurement device 1, an input device 52 serving as the "input unit" configured by a keyboard and a mouse or a touch panel, a display device 53 serving as the "display unit" having a display screen such as a liquid crystal screen, an image data storage device 54 configured to successively store luminance image data and the like taken and obtained by the cameras 33A and 33B, a calculation result storage device 55 configured to store the results of various calculations, and a set data storage device 56 configured to store in advance various pieces of information.

The microcomputer 51 includes, for example, a CPU 51a serving as a computing unit, a ROM 51b configured to store various programs, and a RAM 51c configured to temporarily store various data, for example, calculation data and input/output data, and is electrically connected with the respective devices 52 to 56 described above.

The following describes the calibration of the cameras 33A and 33B (the polarization image sensor 70A and 70B) performed prior to a start of three-dimensional measurement. The calibration performed according to the embodiment includes a process of obtaining in advance a variation in sensitivity (gain) based on the characteristic of the respective light-receiving elements 74 and a process of obtaining in advance absolute angles of the transmission axes of the polarizers 75 (transmission axis ablute angle data).

The process of obtaining the variation in sensitivity of the respective light-receiving elements 74 is described first. A procedure uses a light source such as a halogen lamp to irradiate the camera 33A or 33B (the polarization image sensor 70A or 70B) with non-polarized uniform light and performs imaging. The procedure subsequently calculates a variation in luminance data (light intensity data) of the respective pixels, based on luminance image data obtained by imaging, corrects the variation and stores the corrected variation into the set data storage device 56.

Figure 7:
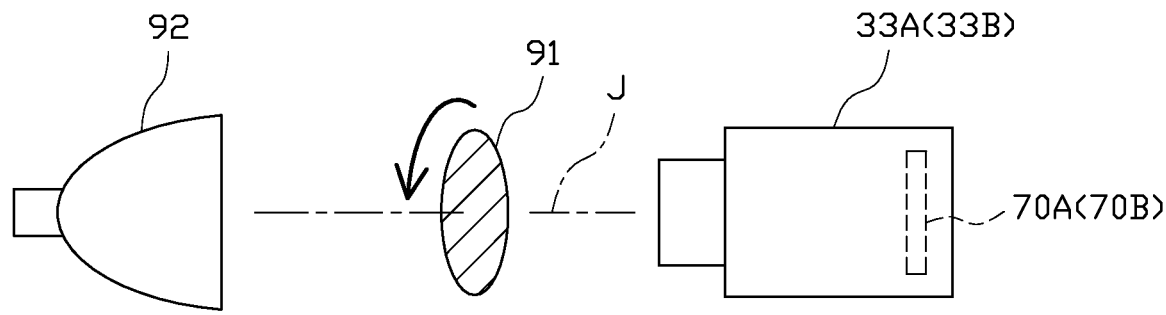
FIG. 7 is a diagram illustrating a method of a calibration to obtain an absolute angle of a transmission axis of a polarizer.

The process of obtaining in advance the absolute angles of the transmission axes of the polarizers 75 (transmission axis ablute angle data) is described next with reference to FIG. 7 and FIG. 8.

A procedure first places a rotatable reference polarizing plate 91 in front of the first camera 33A (or the second camera 33B), adjusts a rotating axis of the reference polarizing plate 91 to an optical axis J of the first camera 33A (or the second camera 33B) and places a light source 92, for example, a halogen lamp, configured to irradiate the reference polarizing plate 91 and the first camera 33A (or the second camera 33B) with non-polarized uniform light.

The procedure then continually rotates the reference polarizing plate 91 with emission of light from the light source 92. In this state, the procedure performs imaging with the first camera 33A (or the second camera 33B) every time the reference polarizing plate 91 is rotated, for example, by one degree and successively stores obtained luminance image data.

Figure 8:
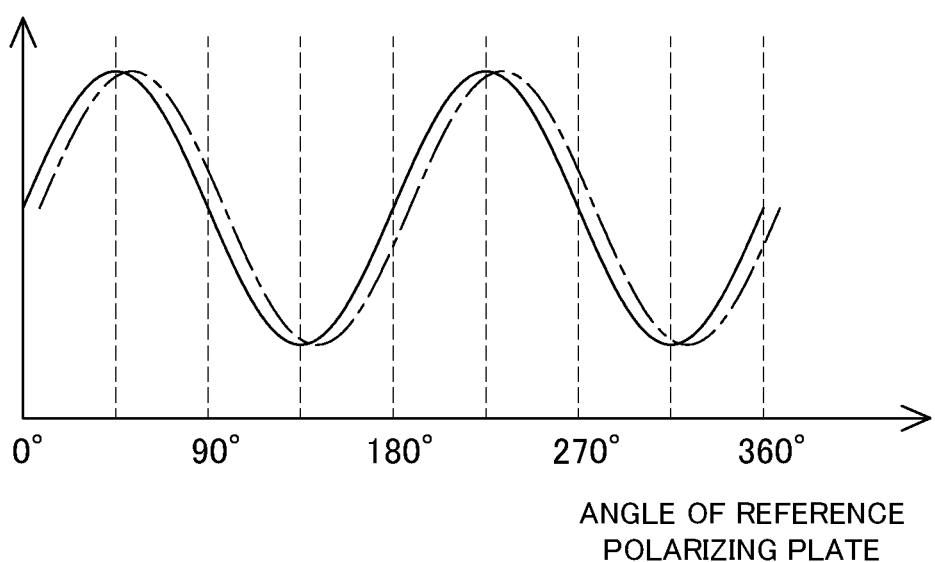
FIG. 8 is a diagram showing a relationship between rotation angle of a reference polarizing plate at the time of a calibration and luminance of light transmitted through the polarizer.

For example, when the transmission axis absolute angle β of the second polarizer 75b located at a predetermined pixel position is identical with the set angle of "45 degrees" and includes no error, the luminance data with regard to this pixel position draws a sine curve that gives a maximum measurement value at a rotation angle of 45 degrees of the reference polarizing plate 91 as shown in FIG. 8 (as shown by a sine curve of a solid line in FIG. 8).

When the transmission axis absolute angle β of the second polarizer 75b located at a predetermined pixel position is slightly deviated from the set angle of "45 degrees", on the other hand, the luminance data with regard to this pixel position draws a sine curve that gives a maximum measurement value at a position slightly shifted from the rotation angle of 45 degrees (for example, the rotation angle of 45 degrees+3 degrees) of the reference polarizing plate 91 as shown in FIG. 8 (as shown by a sine curve of a one-dot chain line in FIG. 8).

The procedure subsequently stores an angle corresponding to a rotation angle position of the reference polarizing plate 91 that gives maximum luminance data with regard to a predetermined pixel position, as the absolute angle of the transmission axis of the polarizer 75 (transmission axis absolute angle data) with regard to the pixel position, into the set data storage device 56. Accordingly, the set data storage device 56 configures the angle data storage unit (or the storage device) according to the embodiment.

As described above, this process actually measures in advance and stores the transmission axis absolute angle data with regard to each of all the polarizers 75 in the polarizer array 72.

For example, the polarizer array 72 illustrated in FIG. 6 has transmission axis absolute angle data $\gamma_1$ (set angle of 90 degrees±an error $c_1$) of the third polarizer 75*c* at a first pixel position, transmission axis absolute angle data $\beta_2$ (set angle of 45 degrees±an error $b_2$) of the second polarizer 75*b* at a second pixel position, transmission axis absolute angle data $\gamma_3$ (set angle of 90 degrees±an error $c_3$) of the third polarizer 75*c* at a third pixel position, transmission axis absolute angle data $\beta_4$ (set angle of 45 degrees±an error $b_4$) of the second polarizer 75*b* at a fourth pixel position, transmission axis absolute angle data $\delta_5$ (set angle of 135 degrees±an error $d_5$) of the fourth polarizer 75*d* at a fifth pixel position, transmission axis absolute angle data $\alpha_6$ (set angle of 0 degree±an error $a_6$) of the first polarizer 75*a* at a sixth pixel position, transmission axis absolute angle data $\delta_7$ (set angle of 135 degrees±an error $d_7$) of the fourth polarizer 75*d* at a seventh pixel position, transmission axis absolute angle data $\alpha_8$ (set angle of 0 degree±an error $a_8$) of the first polarizer 75*a* at an eighth pixel position, transmission axis absolute angle data $\gamma_9$ (set angle of 90 degrees±an error $c_9$) of the third polarizer 75*c* at a ninth pixel position, transmission axis absolute angle data $\beta_{10}$ (set angle of 45 degrees±an error $b_{10}$) of the second polarizer 75*b* at a tenth pixel position, transmission axis absolute angle data $\gamma_{11}$ (set angle of 90 degrees±an error $c_{11}$) of the third polarizer 75*c* at an eleventh pixel position, transmission axis absolute angle data $\beta_{12}$ (set angle of 45 degrees±an error $b_{12}$) of the second polarizer 75*b* at a twelfth pixel position, transmission axis absolute angle data $\delta_{13}$ (set angle of 135 degrees±an error $d_{13}$) of the fourth polarizer 75*d* at a thirteenth pixel position, transmission axis absolute angle data $\alpha_{14}$ (set angle of 0 degree±an error $a_{14}$) of the first polarizer 75*a* at a fourteenth pixel position, transmission axis absolute angle data $\delta_{15}$ (set angle of 135 degrees±an error $d_{15}$) of the fourth polarizer 75*d* at a fifteenth pixel position and transmission axis absolute angle data $\alpha_{16}$ (set angle of 0 degree±an error $a_{16}$) of the first polarizer 75*a* at a sixteenth pixel position. The absolute angle of each of the polarizers 75 includes a predetermined error relative to the set angle $\alpha=0$ degree, $\beta=45$ degrees, $\gamma=90$ degrees or $\delta=135$ degrees.

The following describes the functions of the three-dimensional measurement device 1. According to the embodiment, as described later, radiation of the first light and radiation of the second light are performed simultaneously, and an optical path of the first light and an optical path of the second light partly overlap with each other. In order to facilitate understanding, the optical path of the first light and the optical path of the second light are individually described with reference to different drawings.

Figure 3:
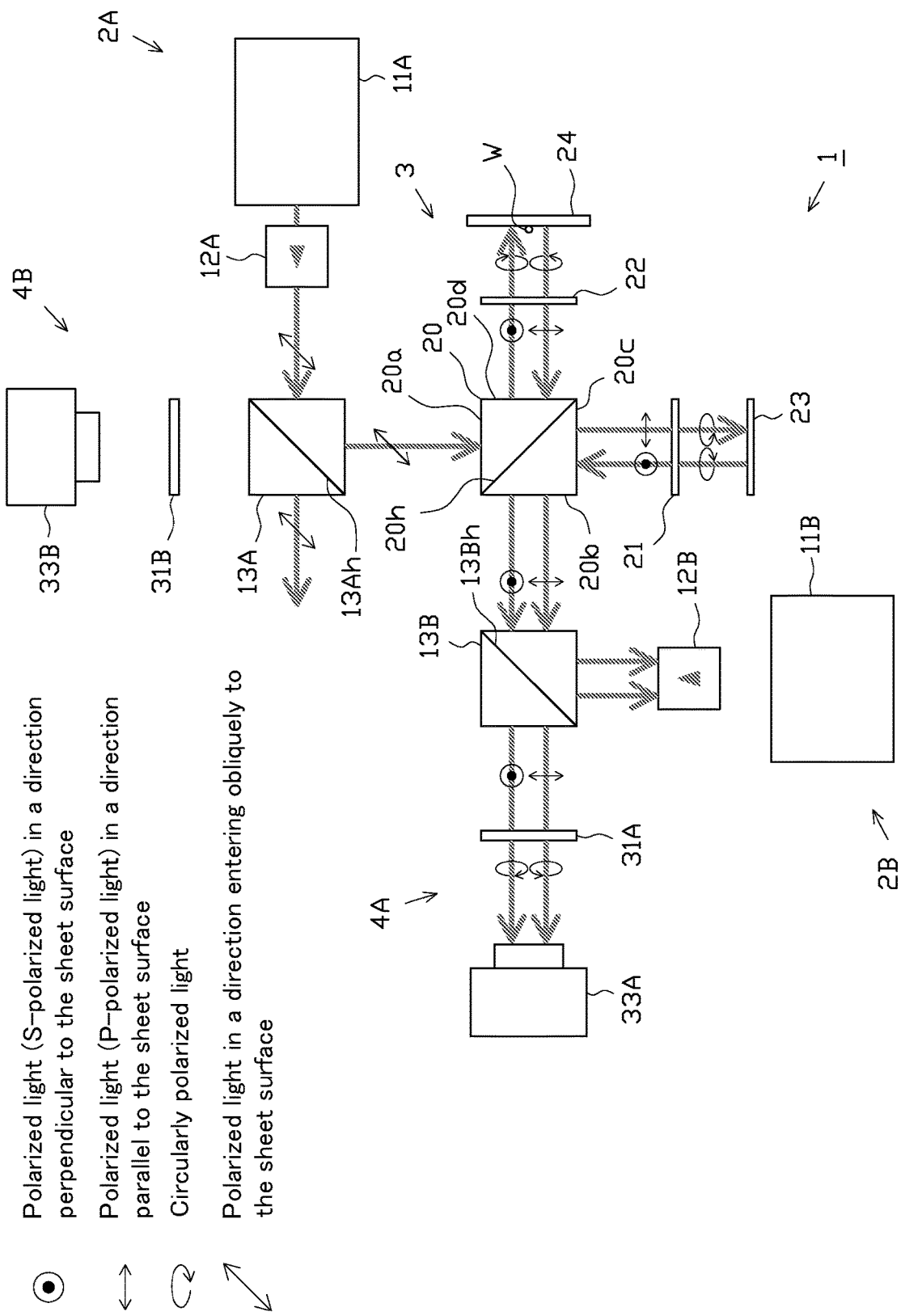
FIG. 3 is an optical path diagram illustrating an optical path of first light.

An optical path of the first light is described first with reference to FIG. 3. As shown in FIG. 3, the first light having the wavelength $\lambda_1$ (the linearly polarized light having the polarizing direction inclined at 45 degrees to the X-axis direction and the Y-axis direction) is emitted leftward in the Z-axis direction from the first light emitter 11A.

The first light emitted from the first light emitter 11A passes through the first light isolator 12A and enters the first non-polarizing beam splitter 13A. Part of the first light entering the first non-polarizing beam splitter 13A is transmitted leftward in the Z-direction, while the remaining part of the first light is reflected downward in the Y-axis direction.

The first light reflected downward in the Y-axis direction (the linearly polarized light having the polarizing direction inclined at 45 degrees to the X-axis direction and the Z-axis direction) enters the first face 20*a* of the polarizing beam splitter 20. The first light transmitted leftward in the Z-axis direction, on the other hand, does not enter any optical system but becomes unused light.

With regard to the first light entering downward in the Y-axis direction from the first face 20*a* of the polarizing beam splitter 20, a P-polarized light component thereof is transmitted downward in the Y-axis direction and is emitted as reference light from the third face 20*c*, while an S-polarized light component thereof is reflected rightward in the Z-axis direction and is emitted as object light from the fourth face 20*d*.

The reference light (the P-polarized light) with regard to the first light emitted from the third face 20*c* of the polarizing beam splitter 20 passes through the quarter-wave plate 21 to be converted into clockwise circularly polarized light and is then reflected by the reference plane 23. The rotating direction relative to the traveling direction of light is maintained here. The reference light with regard to the first light then passes through the quarter-wave plate 21 again to be converted from the clockwise circularly polarized light into S-polarized light and re-enters the third face 20*c* of the polarizing beam splitter 20.

The object light (the S-polarized light) with regard to the first light emitted from the fourth face 20*d* of the polarizing beam splitter 20, on the other hand, passes through the quarter-wave plate 22 to be converted into counterclockwise circularly polarized light, and is then reflected by the work W. The rotating direction relative to the traveling direction of light is maintained here. The object light with regard to the first light then passes through the quarter-wave plate 22 again to be converted from the counterclockwise circularly polarized light into P-polarized light and re-enters the fourth face 20*d* of the polarizing beam splitter 20.

The reference light (the S-polarized light) with regard to the first light that re-enters the third face 20*c* of the polarizing beam splitter 20 is reflected leftward in the Z-axis direction by the joint surface 20*h*, while the object light (the P-polarized light) with regard to the first light that re-enters the fourth face 20*d* is transmitted leftward in the Z-axis direction through the joint surface 20*h*. A combined light obtained by combining the reference light and the object light with regard to the first light with each other is emitted as output light from the second face 20*b* of the polarizing beam splitter 20.

The combined light (the reference light and the object light) with regard to the first light emitted from the second face 20*b* of the polarizing beam splitter 20 enters the second non-polarizing beam splitter 13B. When the combined light with regard to the first light enters the second non-polarizing beam splitter 13B leftward in the Z-axis direction, part of the combined light is transmitted leftward in the Z-axis direction, and the remaining part of the combined light is reflected downward in the Y-axis direction. The combined light (the reference light and the object light) transmitted leftward in the Z-axis direction enters the first imaging system 4A. The combined light reflected downward in the Y-axis direction is, on the other hand, blocked by the second light isolator 12B and becomes unused light.

When the combined light (the reference light and the object light) with regard to the first light enters the first imaging system 4A, the quarter-wave plate 31A converts the reference light component (the S-polarized light component) thereof into counterclockwise circularly polarized light, while converting the object light component (the P-polarized light component) thereof into clockwise circularly polarized light. The counterclockwise circularly polarized light and the clockwise circularly polarized light have different rotating directions and thus do not interfere with each other.

The combined light with regard to the first light subsequently enters the first camera 33A (the polarization image sensor 70A) and passes through the polarizer array 72, so that the reference light component and the object light component of the combined light interfere with each other in the phases corresponding to the angles of the transmission axes of the respective polarizers 75a, 75b, 75c and 75d. Images of the interfering lights with regard to the first light are then taken by the first camera 33A (the light-receiving element array 71).

More concretely, the light-receiving element 74 corresponding to the first polarizer 75a receives the interfering light with regard to the first light having a phase difference of approximate "0 degree" between the reference light component and the object light component given by the first polarizer 75a.

Similarly, the light-receiving element 74 corresponding to the second polarizer 75b receives the interfering light with regard to the first light having a phase difference of approximate "90 degrees" between the reference light component and the object light component given by the second polarizer 75b. The light-receiving element 74 corresponding to the third polarizer 75c receives the interfering light with regard to the first light having a phase difference of approximate "180 degrees" between the reference light component and the object light component given by the third polarizer 75c. The light-receiving element 74 corresponding to the fourth polarizer 75d receives the interfering light with regard to the first light having a phase difference of approximate "270 degrees" between the reference light component and the object light component given by the fourth polarizer 75d.

Strictly speaking, however, the interfering light (the reference light component and the object light component) transmitted through each of the polarizers 75 has a phase difference corresponding to the absolute angle data with regard to the polarizer 75 described above.

Figure 4:
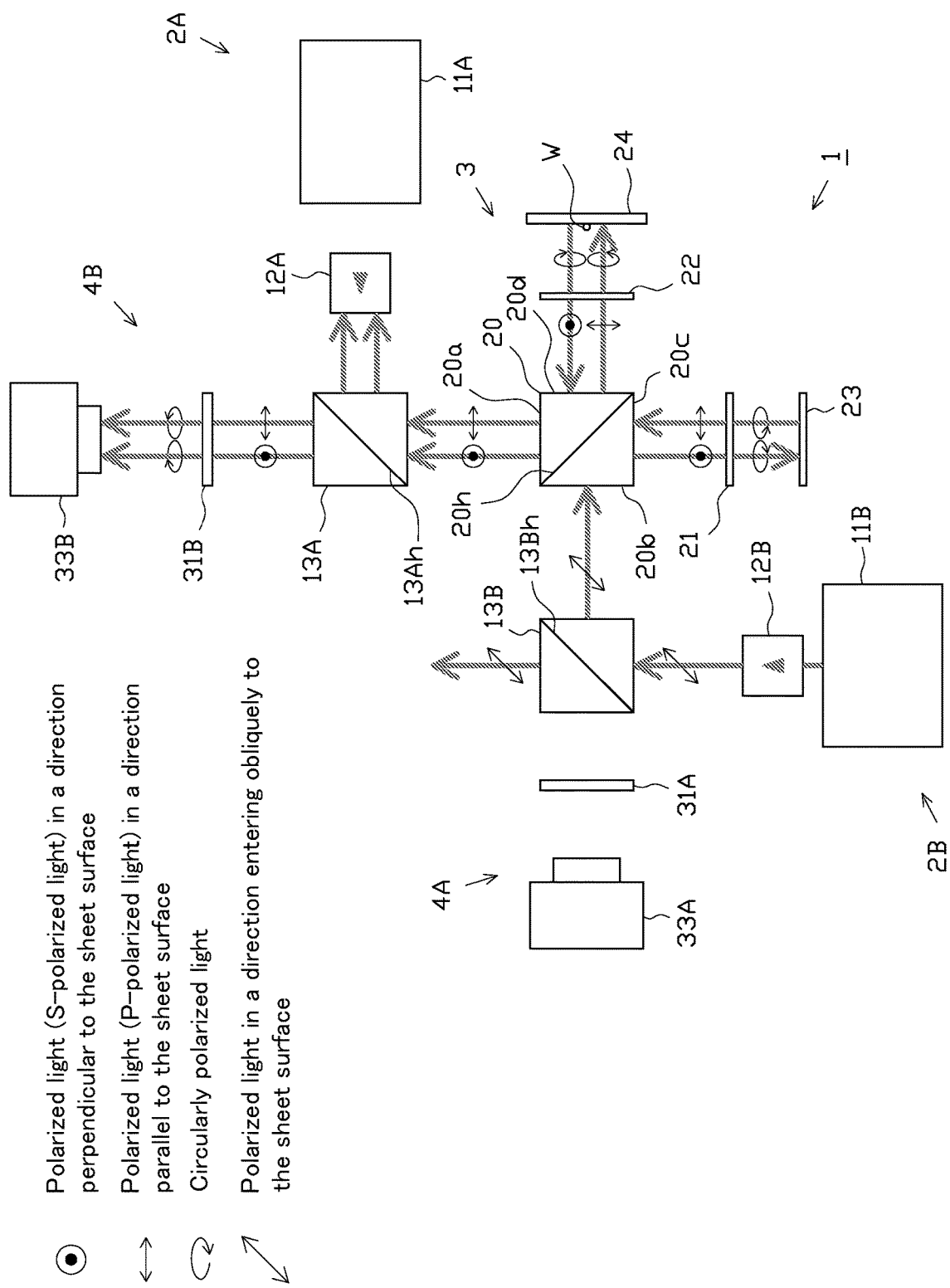
FIG. 4 is an optical path diagram illustrating an optical path of second light.

An optical path of the second light is described next with reference to FIG. 4. As shown in FIG. 4, the second light having the wavelength $\lambda_2$ (the linearly polarized light having the polarizing direction inclined at 45 degrees to the X-axis direction and the Z-axis direction) is emitted upward in the Y-axis direction from the second light emitter 11B.

The second light emitted from the second light emitter 11B passes through the second light isolator 12B and enters the second non-polarizing beam splitter 13B. Part of the second light entering the second non-polarizing beam splitter 13B is transmitted upward in the Y-direction, while the remaining part of the second light is reflected rightward in the Z-axis direction.

The second light reflected rightward in the Z-axis direction (the linearly polarized light having the polarizing direction inclined at 45 degrees to the X-axis direction and the Y-axis direction) enters the second face 20b of the polarizing beam splitter 20. The second light transmitted upward in the Y-axis direction, on the other hand, does not enter any optical system but becomes unused light.

In the optical path of the second light, the "second face 20b (left side face in the Z-axis direction) of the polarizing beam splitter 20", which the second light enters, corresponds to the "first face" described above in Aspect 2.

With regard to the second light entering rightward in the Z-axis direction from the second face 20b of the polarizing beam splitter 20, an S-polarized light component thereof is reflected downward in the Y-axis direction and is emitted as reference light from the third face 20c, while a P-polarized light component thereof is transmitted rightward in the Z-axis direction and is emitted as object light from the fourth face 20d.

The reference light (the S-polarized light) with regard to the second light emitted from the third face 20c of the polarizing beam splitter 20 passes through the quarter-wave plate 21 to be converted into counterclockwise circularly polarized light and is then reflected by the reference plane 23. The rotating direction relative to the traveling direction of light is maintained here. The reference light with regard to the second light then passes through the quarter-wave plate 21 again to be converted from the counterclockwise circularly polarized light into P-polarized light and re-enters the third face 20c of the polarizing beam splitter 20.

The object light (the P-polarized light) with regard to the second light emitted from the fourth face 20d of the polarizing beam splitter 20, on the other hand, passes through the quarter-wave plate 22 to be converted into clockwise circularly polarized light, and is then reflected by the work W. The rotating direction relative to the traveling direction of light is maintained here. The object light with regard to the second light then passes through the quarter-wave plate 22 again to be converted from the clockwise circularly polarized light into S-polarized light and re-enters the fourth face 20d of the polarizing beam splitter 20.

The reference light (the P-polarized light) with regard to the second light that re-enters the third face 20c of the polarizing beam splitter 20 is transmitted upward in the Y-axis direction through the joint surface 20h, while the object light (the S-polarized light) with regard to the second light that re-enters the fourth face 20d is reflected upward in the Y-axis direction by the joint surface 20h. A combined light obtained by combining the reference light and the object light with regard to the second light with each other is emitted as output light from the first face 20a of the polarizing beam splitter 20.

In the optical path of the second light, the "first face 20a (upper side face in the Y-axis direction) of the polarizing beam splitter 20", from which the combined light of the reference light and the object light with regard to the second light is emitted, corresponds to the "second face" described above in Aspect 2.

The combined light (the reference light and the object light) with regard to the second light emitted from the first face 20a of the polarizing beam splitter 20 enters the first non-polarizing beam splitter 13A. When the combined light with regard to the second light enters the first non-polarizing beam splitter 13A upward in the Y-axis direction, part of the combined light is transmitted upward in the Y-axis direction, and the remaining part of the combined light is reflected rightward in the Z-axis direction. The combined light (the reference light and the object light) transmitted upward in the Y-axis direction enters the second imaging system 4B.

The combined light reflected rightward in the Z-axis direction is, on the other hand, blocked by the first light isolator 12A and becomes unused light.

When the combined light (the reference light and the object light) with regard to the second light enters the second imaging system 4B, the quarter-wave plate 31B converts the reference light component (the P-polarized light component) thereof into clockwise circularly polarized light, while converting the object light component (the S-polarized light component) thereof into counterclockwise circularly polarized light. The counterclockwise circularly polarized light and the clockwise circularly polarized light have different rotating directions and thus do not interfere with each other.

The combined light with regard to the second light subsequently enters the second camera 33B (the polarization image sensor 70B) and passes through the polarizer array 72, so that the reference light component and the object light component of the combined light interfere with each other in the phases corresponding to the angles of the transmission axes of the respective polarizers 75a, 75b, 75c and 75d. Images of the interfering lights with regard to the second light are then taken by the second camera 33B (the light-receiving element array 71).

More concretely, the light-receiving element 74 corresponding to the first polarizer 75a receives the interfering light with regard to the second light having a phase difference of approximate "0 degree" between the reference light component and the object light component given by the first polarizer 75a.

Similarly, the light-receiving element 74 corresponding to the second polarizer 75b receives the interfering light with regard to the second light having a phase difference of approximate "90 degrees" between the reference light component and the object light component given by the second polarizer 75b. The light-receiving element 74 corresponding to the third polarizer 75c receives the interfering light with regard to the second light having a phase difference of approximate "180 degrees" between the reference light component and the object light component given by the third polarizer 75c. The light-receiving element 74 corresponding to the fourth polarizer 75d receives the interfering light with regard to the second light having a phase difference of approximate "270 degrees" between the reference light component and the object light component given by the fourth polarizer 75d.

Strictly speaking, however, the interfering light (the reference light component and the object light component) transmitted through each of the polarizers 75 has a phase difference corresponding to the absolute angle data with regard to the polarizer 75 described above.

The following describes a procedure of a shape measurement process performed by the control device 5 in detail. After a work W is placed on the mounting portion 24, the control device 5 causes the first light to be radiated from the first projection optical system 2A and simultaneously causes the second light to be radiated from the second projection optical system 2B. As a result, the combined light (the reference light and the object light) with regard to the first light is emitted from the second face 20b of the polarizing beam splitter 20 in the interference optical system 3, and at the same time, the combined light (the reference light and the object light) with regard to the second light is emitted from the first face 20a of the polarizing beam splitter 20.

An image of the combined light with regard to the first light emitted from the second face 20b of the polarizing beam splitter 20 is taken by the first imaging system 4A, while an image of the combined light with regard to the second light emitted from the first face 20a of the polarizing beam splitter 20 is taken by the second imaging system 4B.

Luminance image data respectively obtained by using the respective cameras 33A and 33B are output to the control device 5. The control device 5 stores the input luminance image data into the image data storage device 54.

The luminance image data each obtained by one imaging process (the luminance image data with regard to the first light and the luminance image data with regard to the second light) include four different types of luminance data required for three-dimensional measurement (intensity data of four different interfering lights having different phases).

The control device 5 subsequently measures a surface shape of the work W by the phase shift method, based on the luminance image data with regard to the first light and the luminance image data with regard to the second light stored in the image data storage device 54. Accordingly, the control device 5 performs height measurement at respective measurement positions on the surface of the work W.

According to the embodiment, the control device 5 specifies a center position in a range of four adjacent pixels arrayed in a two-by-two matrix, as one measurement position, and calculates one height data (phase difference) from luminance data of these four pixels.

For example, the control device 5 specifies a center position in a range of four pixels, "first pixel position", "second pixel position", "fifth pixel position" and "sixth pixel position" shown in FIG. 6, as one measurement position, and calculates one height data from luminance data of these four pixels. The control device 5 subsequently specifies a center position in a range of four pixels, "second pixel position", "third pixel position", "sixth pixel position", and "seventh pixel position", as one measurement position, and calculates one height data from luminance data of these four pixels.

Height measurement is performed over the entire surface of the work W by successively shifting the measurement position by one pixel in a vertical direction or in a lateral direction and obtaining height data at the measurement position in this manner.

The following describes a procedure of height measurement by using the phase shift method. The luminance of the luminance image data with regard to the first light or with regard to the second light at a predetermined pixel position (coordinate position) is expressed by Expression (T1) given below:

[Math. 3]

$$I_A = \frac{1+a^2}{2} + a\sin(2A + \phi) \tag{T1}$$

where $I_A$ denotes luminance data (intensity data of interfering light), A denotes transmission axis absolute angle data of a polarizer, a denotes an object reflectance ($0 < a \leq 1$), and $\phi$ denotes a phase difference between reference light and object light.

Accordingly, luminance data of four pixels arrayed in a two-by-two matrix with regard to the predetermined measurement position are respectively expressed by Expressions (T2), (T3), (T4) and (T5) given below:

[Math. 4]

$$\begin{cases} I_\alpha = \dfrac{1+a^2}{2} + a\sin(2\alpha + \phi) & (T2) \\ I_\beta = \dfrac{1+a^2}{2} + a\sin(2\beta + \phi) & (T3) \\ I_\gamma = \dfrac{1+a^2}{2} + a\sin(2\gamma + \phi) & (T4) \\ I_\delta = \dfrac{1+a^2}{2} + a\sin(2\delta + \phi) & (T5) \end{cases}$$

where $I_\alpha$ denotes luminance data of a first pixel, $I_\beta$ denotes luminance data of a second pixel, $I_\gamma$ denotes luminance data of a third pixel, $I_\delta$ denotes luminance data of a fourth pixel, α denotes transmission axis absolute angle data of a polarizer with regard to the first pixel, β denotes transmission axis absolute angle data of a polarizer with regard to the second pixel, γ denotes transmission axis absolute angle data of a polarizer with regard to the third pixel, δ denotes transmission axis absolute angle data of a polarizer with regard to the fourth pixel, a denotes the object reflectance (0<a≤1), and ϕ denotes the phase difference between reference light and object light.

Based on the above Expressions (T2) to (T5), the procedure subsequently calculates the phase difference ϕ of interfering light (a reference light component and an object light component) according to Expression (T6) given below:

[Math. 5]

$$\phi = \tan^{-1} \dfrac{-(I_\beta - I_\delta)(\sin 2\alpha - \sin 2\gamma) + (I_\alpha - I_\gamma)(\sin 2\beta - \sin 2\delta)}{(I_\beta - I_\delta)(\cos 2\alpha - \cos 2\gamma) - (I_\alpha - I_\gamma)(\cos 2\beta - \cos 2\delta)} \quad (T6)$$

The procedure then uses this phase difference ϕ to perform a phase difference conversion process or the like and calculates height data that three-dimensionally shows a surface concavo-convex shape of the work W. The measurement result (height data) of the work W thus obtained is stored into the calculation result storage device 55 of the control device 5.

The following describes the principle of a two wavelength phase shift method. Measurement using two different lights having different wavelengths (wavelengths $\lambda_1$ and $\lambda_2$) is equivalent to measurement using light of a composite wavelength $\lambda_0$. Its measurement range is extended to $\lambda_0/2$. The composite wavelength $\lambda_0$ is expressed by Expression (M1) given below:

$$\lambda_0 = (\lambda_1 \times \lambda_2)/(\lambda_2 - \lambda_1)$$

where $\lambda_2 > \lambda_1$. (M1)

For example, when $\lambda_1=1500$ nm and $\lambda_2=1503$ nm, $\lambda_0=751.500$ μm according to Expression (M1) given above, and the measurement range is $\lambda_0/2=375.750$ μm.

The measurement procedure by the two wavelength phase shift method is known in the art (as described in, for example, JP No. 6271493B) and is not specifically described here. Using the two different lights having different wavelengths allows for extension of the measurement range as described above.

As described above in detail, the configuration of the embodiment uses the polarization image sensors 70A and 70B where the four different polarizers 75a, 75b, 75c and 75d having different set angles of transmission axes by 45 degrees each are arranged in a predetermined array to be one-to-one mapping to the respective light-receiving elements 74, as the imaging elements of the cameras 33A and 33B. This configuration enables a plurality of different luminance data required for height measurement by the phase shift method with regard to each predetermined measurement position of the work W to be simultaneously obtained by one single imaging operation using each of the cameras 33A and 33B. As a result, this achieves, for example, simplification of the configuration and reduction of the time required for obtaining data.

Moreover, the configuration of the embodiment does not use the set angle of the transmission axis but uses the transmission axis absolute angle data, which is the observed value obtained by previous actual measurement, as the angle data of the transmission axis of each polarizer 75 used for calculation of the phase difference between the reference light and the object light by the phase shift method. This configuration determines the more accurate phase difference. As a result, this achieves, for example, further improvement of the measurement accuracy.

Furthermore, the configuration of the embodiment neither needs to use a common reference that is to be shared by all the measurement positions nor needs to regulate relative errors between a plurality of pixels relating to the phase shift. The configuration of the embodiment also does not need to provide a plurality of correction values with regard to one identical pixel and change a correction value to be used according to each shift in the measurement position.

Second Embodiment

The following describes a second embodiment with reference to the drawings. This embodiment employs a different procedure from that of the first embodiment to calculate a phase difference ϕ of interfering light with regard to a predetermined measurement position, based on luminance image data obtained by the imaging process. Accordingly, the characteristic part of this embodiment is described below in detail, whereas the like components to those of the first embodiment are expressed by the like reference signs and are not described in detail.

Figure 9:
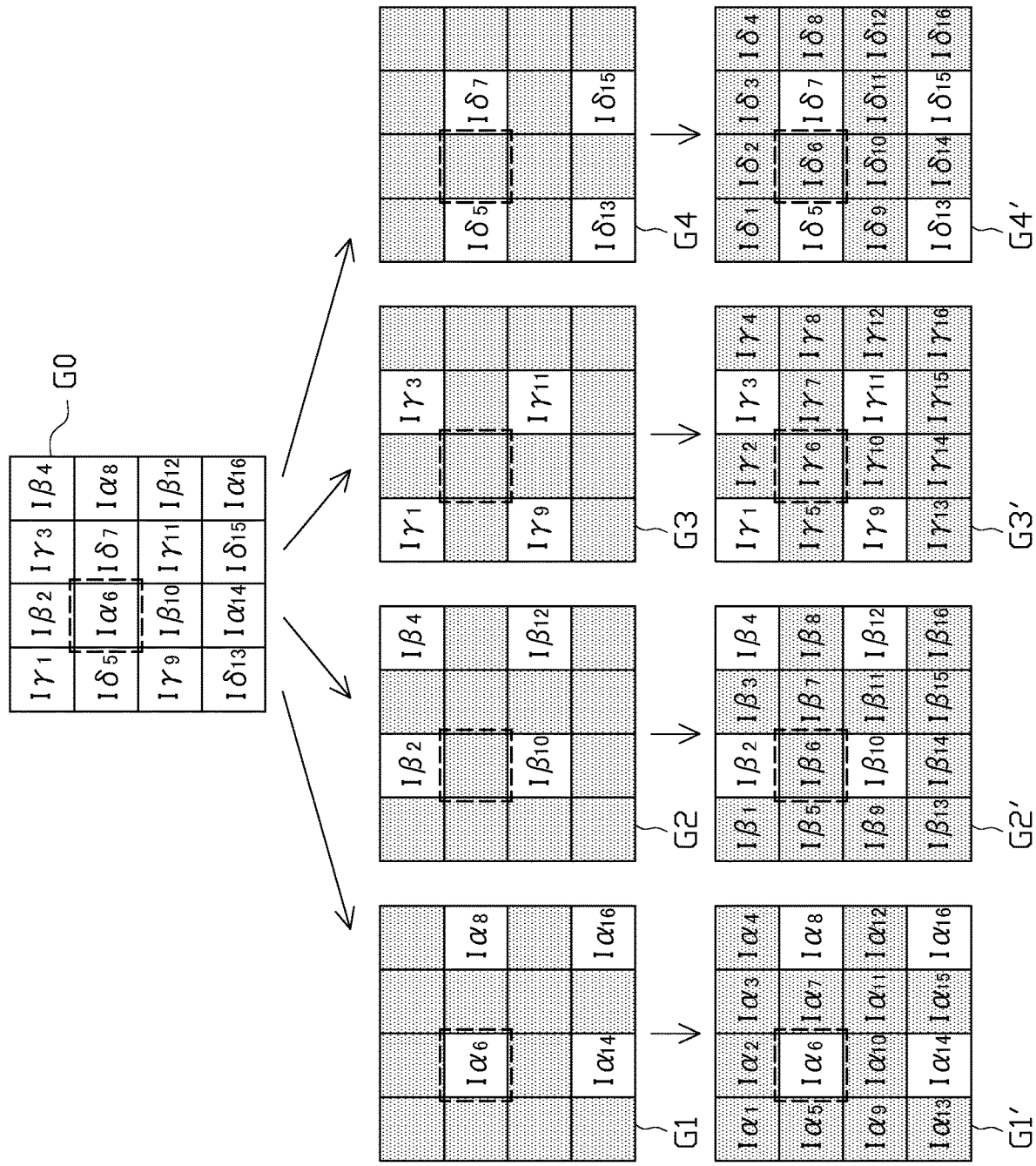
FIG. 9 is a diagram illustrating a procedure of a data interpolation process according to a second embodiment.
Figure 10:
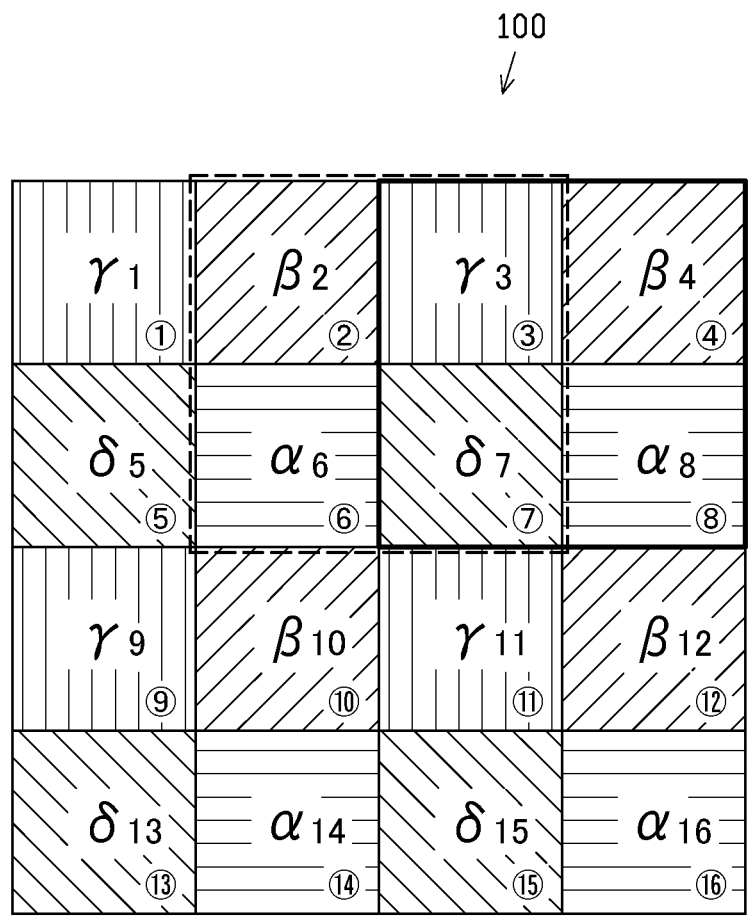
FIG. 10 is a schematic diagram illustrating closeup of a polarization image sensor where four different types of polarizers having different set angles of transmission axes are arranged in a predetermined array.

When the imaging process is completed to obtain the luminance image data (the luminance image data with regard to the first light and the luminance image data with regard to the second light) by using the respective cameras 33A and 33B, the procedure of this embodiment first specifies the obtained luminance image data as original image data G0 and generates four different intermediate image data G1 to G4 as shown in FIG. 9.

More specifically, the procedure generates first intermediate image data G1 by extracting luminance data of pixels corresponding to the first polarizers 75a from the original image data G0, second intermediate image data G2 by extracting luminance data of pixels corresponding to the second polarizers 75b from the original image data G0, third intermediate image data G3 by extracting luminance data of pixels corresponding to the third polarizers 75c from the original image data G0, and fourth intermediate image data G4 by extracting luminance data of pixels corresponding to the fourth polarizers 75d from the original image data G0.

The procedure subsequently interpolates luminance data in data missing parts of the respective intermediate image data G1 to G4 (data-missing blank spaces filled with by a halftone dot pattern in FIG. 9) to generate interpolated image data G1' to G4'. This interpolation process corresponds to the luminance data interpolation process according to the embodiment. The luminance data interpolation process is described concretely below with reference to mainly FIG. 6 and FIG. 9.

As shown in FIG. 6, for example, the first polarizer 75a is placed at the "sixth pixel position (pixel position enclosed by a broken line in FIG. 6 and in FIG. 9)" of the polarizer array 72, and transmission axis absolute angle data $\alpha_6$ of the first polarizer 75a is obtained with regard to this pixel position by a calibration prior to measurement.

As shown in FIG. 9, for example, with regard to the "sixth pixel position" of the original image data G0, luminance data $I\alpha_6$ of the interfering light transmitted through the first polarizer 75a is obtained. Accordingly, there is no missing luminance data at the "sixth pixel position" in the first intermediate image data G1. There are, on the other hand, missing luminance data at the "sixth pixel position" in the other intermediate image data G2 to G4.

The luminance data interpolation process calculates interpolation data with regard to not only the "sixth pixel position" but all the pixel positions where luminance data is missing (data-missing blank spaces filled with the halftone dot pattern in FIG. 9) in the intermediate image data G1 to G4 as described above, by linear interpolation, based on known existing luminance data adjacent to the respective data missing parts, so as to generate the interpolated image data G1' to G4'.

For example, luminance data $I\beta_6$ at the "sixth pixel position" in the second interpolated image data G2' is an average value of two known luminance data, i.e., luminance data $I\beta_2$ at the "second pixel position" and luminance data $I\beta_{10}$ at the "tenth pixel position", in the original image data G0 (in the second intermediate image data G2).

Luminance data $I\gamma_6$ at the "sixth pixel position" in the third interpolated image data G3' is an average value of four known luminance data, i.e., luminance data $I\gamma_1$ at the "first pixel position", luminance data $I\gamma_3$ at the "third pixel position", luminance data $I\gamma_9$ at the "ninth pixel position", and luminance data $I\gamma_{11}$ at the "eleventh pixel position", in the original image data G0 (in the intermediate image data G3).

Luminance data $I\delta_6$ at the "sixth pixel position" in the fourth interpolated image data G4' is an average value of two known luminance data, i.e., luminance data $I\delta_5$ at the "fifth pixel position" and luminance data $I\delta_7$ at the "seventh pixel position", in the original image data G0 (in the intermediate image data G4).

The procedure subsequently performs an angle data interpolation process to interpolate transmission axis absolute angle data corresponding to the respective pixel positions in the above interpolated image data G1' to G4' by a method similar to the luminance data interpolation process described above (refer to the procedure shown in FIG. 9).

The angle data interpolation process first specifies an array of transmission axis absolute angle data of the polarizers 75 with regard to all the pixels of each of the cameras 33A and 33B (each of the polarization image sensors 70A and 70B), which are actually measured in advance and are stored in the set data storage device 56, as original angle data array F0 and generates four different intermediate angle data arrays F1 to F4 from the original angle data array F0.

More specifically, the angle data interpolation process generates a first intermediate angle data array F1 by extracting transmission axis absolute angle data of the first polarizers 75a from the original angle data array F0, a second intermediate angle data array F2 by extracting transmission axis absolute angle data of the second polarizers 75b from the original angle data array F0, a third intermediate angle data array F3 by extracting transmission axis absolute angle data of the third polarizers 75c from the original angle data array F0, and a fourth intermediate angle data array F4 by extracting transmission axis absolute angle data of the fourth polarizers 75d from the original angle data array F0.

The angle data interpolation process subsequently interpolates transmission axis absolute angle data in data missing parts of the respective intermediate angle data arrays F1 to F4 to generate interpolated angle data arrays F1' to F4'. The following describes this angle data interpolation process more concretely.

As shown in FIG. 6, for example, transmission axis absolute angle data $\alpha_6$ is obtained by a calibration prior to measurement, with regard to the first polarizer 75a placed at the "sixth pixel position" in the polarizer array 72.

Accordingly, there is no missing transmission axis absolute angle data at the "sixth pixel position" in the first intermediate angle data array F1. The second polarizer 75b, the third polarizer 75c and the fourth polarizer 75d are, on the other hand, not present at the "sixth pixel position" in the actual polarizer array 72, so that there are missing transmission axis absolute angle data at the "sixth pixel position" in the other intermediate angle data arrays F2 to F4.

The angle data interpolation process calculates interpolation data with regard to not only the "sixth pixel position" but all the pixel positions where transmission axis absolute angle data is missing in the intermediate angle data arrays F1 to F4 as described above, by linear interpolation, based on known existing transmission axis absolute angle data adjacent to the respective data missing parts, so as to generate the interpolated angle data arrays F1' to F4'.

For example, transmission axis absolute angle data $\beta_6$ at the "sixth pixel position" in the second interpolated angle data array F2' is an average value of two known transmission axis absolute angle data, i.e., transmission axis absolute angle data $\beta_2$ at the "second pixel position" and transmission axis absolute angle data $\beta_{10}$ at the "tenth pixel position" in the original angle data array F0 (in the second intermediate angle data array F2).

Transmission axis absolute angle data $\gamma_6$ at the "sixth pixel position" in the third interpolated angle data array F3' is an average value of four known transmission axis absolute angle data, i.e., transmission axis absolute angle data $\gamma_1$ at the "first pixel position", transmission axis absolute angle data $\gamma_3$ at the "third pixel position", transmission axis absolute angle data $\gamma_9$ at the "ninth pixel position", and transmission axis absolute angle data $\gamma_{11}$ at the "eleventh pixel position" in the original angle data array F0 (in the third intermediate angle data array F3).

Transmission axis absolute angle data $\delta_6$ at the "sixth pixel position" in the fourth interpolated angle data array F4' is an average value of two known transmission axis absolute angle data, i.e., transmission axis absolute angle data $\delta_5$ at the "fifth pixel position" and transmission axis absolute angle data $\delta_7$ at the "seventh pixel position" in the original angle data array F0 (in the fourth intermediate angle data array F4).

The procedure subsequently uses the luminance data with regard to each pixel position in the four interpolated image data G1' to G4' generated as described above and the transmission axis absolute angle data with regard to each pixel position in the corresponding four interpolated angle data arrays F1' to F4' described above to determine the phase difference $\phi$ of the interfering light (the reference light component and the object light component) at a measurement position corresponding to each pixel of the luminance image data obtained by the imaging process, according to Expression (T6) given above.

For example, with regard to the "sixth pixel position", the phase difference $\phi$ is calculated by substituting the known luminance data $I\alpha_6$ and the known transmission axis absolute angle data $\alpha_6$, as well as the luminance data $I\beta_6$, $I\gamma_6$, and $I\delta_6$ and the transmission axis absolute angle data $\beta_6$, $\gamma_6$ and $\delta_6$ obtained by the respective data interpolation processes described above into Expression (T6) given above.

The procedure then performs, for example, a phase height conversion process or the like by using this phase difference $\phi$ and thereby calculates height data that three-dimensionally shows a surface concavo-convex shape of the work W.

As described above in detail, the configuration of this embodiment has similar functions and advantageous effects to those of the configuration of the first embodiment described above.

Furthermore, the configuration of this embodiment reduces the occurrence of such a trouble that there is a data missing part at a measurement position that is a predetermined position corresponding to one pixel of the luminance image data. Moreover, the configuration of this embodiment performs interpolation of both the luminance data and the transmission axis absolute angle data, thus enhancing the measurement accuracy.

The present disclosure is not limited to the description of the above embodiments but may be implemented, for example, by configurations described below. The present disclosure may also be naturally implemented by applications and modifications other than those illustrated below.

(a) The above respective embodiments do not specifically refer to concrete examples of the work W. The measurement object or the object to be measured is, for example, solder paste printed on a printed circuit board or a solder bump formed on a wafer substrate.

In a modified configuration of the above respective embodiments, the mounting portion 24 which the work W is placed on may be configured to be displaceable in a direction perpendicular to the optical axis, and the surface of the work W may be divided into a plurality of measurement areas. This modified configuration may perform shape measurement in each of the plurality of measurement areas while successively moving through the respective measurement areas, so as to perform shape measurement of the entire work W.

(b) The configuration of the interference optical system (the predetermined optical system) is not limited to the configurations described in the above respective embodiments. For example, the above respective embodiments employ the optical configuration of the Michelson interferometer for the interference optical system. This is, however, not essential. The interference optical system may employ another optical configuration that splits incident light into reference light and object light and that performs measurement of the work W, for example, the optical configuration of a Mach-Zehnder interferometer or a Fizeau interferometer.

(c) The above respective embodiments are configured to perform measurement of the work W by using two different types of lights having different wavelengths. This is, however, not essential. A modification may be configured to perform measurement of the work W by using only one type of light. For example, a modified configuration may omit the second projection optical system 2B and the second imaging system 4B.

In the modified configuration with omission of the second projection optical system 2B and the second imaging system 4B, a further modification may use two different types of lights having different wavelengths. For example, a modified configuration may cause a combined light of a first wavelength light and a second wavelength light to enter an interference optical system, use a predetermined optical separation unit (for example, a dichroic mirror) to separate an interfering light emitted from the interference optical system by wavelength separation to obtain an interfering light with regard to the first wavelength light and an interfering light with regard to the second wavelength light, and perform measurement of the work W, based on luminance image data obtained by individually imaging the interfering lights with regard to the respective wavelength lights.

(d) The configuration relating to the irradiation unit is not limited to the configuration of the projection optical systems 2A and 2B described above. For example, the light emitters 11A and 11B in the above respective embodiments employ the laser light sources and are configured to emit the laser lights. This is, however, not essential, but another configuration may be employed. The configuration employable is required to emit light having a high coherence (coherent light) such as to make at least interference.

For example, a modified configuration may enhance the coherence and emit the coherent light by combining an incoherent light source such as an LED light source with a bandpass filter or a special filter that allows for transmission of only a specific wavelength.

(e) The configurations relating to the imaging unit and the imaging element are not limited to those of the above respective embodiments.

(e-1) For example, the above respective embodiments employ the CCD image sensor as one example of the light-receiving element array 71. The light-receiving element array 71 is, however, not limited to this example but may have a semiconductor element structure, for example, CMOS image sensor.

(e-2) The configuration of the polarization image sensors 70A and 70B in the above respective embodiments includes the light-receiving element array 71, the polarizer array 72 and the microlens array 73. This configuration is, however, not essential. For example, a modified configuration may omit the microlens array 73.

(e-3) The array of the polarizers 74 in the polarizer array 72 is not limited to those of the above respective embodiments.

For example, in the configurations of the above respective embodiments, the four different polarizers 75a, 75b, 75c and 75d having the set angles $\alpha$, $\beta$, $\gamma$ and $\delta$ of the transmission axes that differ by 45 degrees each are arranged in the predetermined sequence. In a modified configuration, the four different polarizers 75a, 75b, 75c and 75d may be arranged in a different sequence.

In another modified configuration, three different polarizers having different transmission axis angles may be arranged in a predetermined sequence. For example, in a modified configuration, three different polarizers having set angles $\alpha$, $\beta$ and $\gamma$ of the transmission axes that differ by 60 degrees or 45 degrees each may be arranged in a predetermined sequence.

(e-4) The above respective embodiments do not specifically refer to concrete examples of the respective polarizers 75 of the polarizer array 72. The structure of each polarizer 75 is not specifically limited, as long as the polarizer 75 has the functions of the polarizer. Examples employable for the polarizer 75 include a polarizer using a photonic crystal formed by self-cloning technique or a wire grid-type polarizer formed by a periodical array of thin wire.

(f) In the above respective embodiments, the configuration of performing height measurement at each measurement position on the surface of the work W by the phase shift method calculates a phase difference φ of interfering light (a reference light component and an object light component) with regard to the measurement position by using four luminance data with regard to the measurement position and four transmission axis absolute angle data corresponding to the four luminance data.

This configuration is, however, not essential, but a modified configuration may calculate a phase difference φ with regard to a predetermined measurement position by using three luminance data with regard to the measurement position and three transmission axis absolute angle data corresponding to the three luminance data.

For example, in the configuration of performing height measurement at the measurement position that is the center position in the range of four pixels in the two-by-two matrix form, based on the luminance image data obtained by the imaging process like the first embodiment described above, a modification may calculate a phase difference φ by using luminance data of three pixels out of the four pixels and three transmission axis absolute angle data corresponding to the three pixels.

In the case of calculating a phase difference φ by using luminance data and transmission axis absolute angle data with regard to a pixel corresponding to the first polarizer 75a (having the set angle α of the transmission axis), a pixel corresponding to the second polarizer 75b (having the set angle β of the transmission axis) and a pixel corresponding to the third polarizer 75c (having the set angle γ of the transmission axis), the luminance data of the three pixels with regard to a predetermined measurement position may be expressed respectively by Expressions (U1), (U2) and (U3) given below according to Expression (T1) given above:

[Math. 6]

$$\begin{cases} I_\alpha = \dfrac{1+a^2}{2} + a\sin(2\alpha + \phi) & (U1) \\ I_\beta = \dfrac{1+a^2}{2} + a\sin(2\beta + \phi) & (U2) \\ I_\gamma = \dfrac{1+a^2}{2} + a\sin(2\gamma + \phi) & (U3) \end{cases}$$

where $I_\alpha$ denotes luminance data of a first pixel, $I_\beta$ denotes luminance data of a second pixel, $I_\gamma$ denotes luminance data of a third pixel, α denotes transmission axis absolute angle data of a polarizer with regard to the first pixel, β denotes transmission axis absolute angle data of a polarizer with regard to the second pixel, γ denotes transmission axis absolute angle data of a polarizer with regard to the third pixel, a denotes the object reflectance (0<a≤1), and φ denotes the phase difference between reference light and object light.

Based on the above Expressions (U1) to (U3), the modified configuration may calculate the phase difference φ of the interfering light (the reference light component and the object light component) according to Expression (U4) given below:

[Math. 7]

$$\phi = \tan^{-1}\dfrac{-(I_\beta - I_\gamma)(\sin2\alpha - \sin2\gamma) + (I_\alpha - I_\gamma)(\sin2\beta - \sin2\gamma)}{(I_\beta - I_\gamma)(\cos2\alpha - \cos2\gamma) - (I_\alpha - I_\gamma)(\cos2\beta - \cos2\gamma)} \quad (U4)$$

The luminance data and the transmission axis absolute angle data with regard to three pixels used for measurement at a predetermined measurement position are obviously not limited to the above example.

For example, in the case of performing height measurement at a measurement position that is the center position in a range of four adjacent pixels arrayed in a two-by-two matrix, a modified configuration may calculate the phase difference φ by using, for example, various data with regard to a pixel of the second polarizer 75b (having the set angle β of the transmission axis), various data with regard to a pixel of the third polarizer 75c (having the set angle γ of the transmission axis) and various data with regard to a pixel of the fourth polarizer 75d (having the set angle δ of the transmission axis).

Similarly, another modification may calculate the phase difference φ by using, for example, various data with regard to a pixel of the third polarizer 75c (having the set angle γ of the transmission axis), various data with regard to a pixel of the fourth polarizer 75d (having the set angle δ of the transmission axis), and various data with regard to a pixel of the first polarizer 75a (having the set angle α of the transmission axis).

Another modification may calculate the phase difference φ by using, for example, various data with regard to a pixel of the fourth polarizer 75d (having the set angle δ of the transmission axis), various data with regard to a pixel of the first polarizer 75a (having the set angle α of the transmission axis), and various data with regard to a pixel of the second polarizer 75b (having the set angle β of the transmission axis).

In these cases, the phase difference φ is calculated by replacing the various data to be substituted in the Expressions (U1) to (U4) given above.

The Expression (U4) given above may be used not only in the first embodiment described above but in the second embodiment described above to calculate the phase difference φ with regard to a predetermined pixel position (measurement position) by using three luminance data and corresponding three transmission axis absolute angle data out of four luminance data and corresponding four transmission axis absolute angle data with regard to the pixel position determined by the interpolation process of the various data.

The above Expression (U4) and the like may also be used in a modified configuration that performs three-dimensional measurement by using a polarization image sensor including only three different types of polarizers having different transmission axis angles.

(g) The method of the interpolation process of the various data described above in the second embodiment is not limited to the linear interpolation described above, but another interpolation technique such as Bicubic interpolation may be employed. A modified configuration may exclude data farthest from an average value in the process of linear interpolation.

(h) The configuration of the above respective embodiments directly stores the transmission axis absolute angle data (for example, the absolute angle of "46 degrees") obtained by actual measurement of the absolute angle of the transmission axis of the polarizer 75. This configuration is, however, not essential. A modified configuration may store data indicating a deviation amount relative to the set angle of the transmission axis of the polarizer 75 (for example, the set angle of "45 degrees"+an error of "1 degree").

(i) The configuration of the first embodiment described above calculates the phase difference φ at a predetermined measurement position, based on the luminance data and the transmission axis absolute angle data with regard to four pixels arrayed in a two-by-two matrix. This configuration is, however, not essential. A modified configuration may calculate the phase difference φ at a predetermined measurement position, based on the luminance data and the transmission axis absolute angle data with regard to aligned three or four pixels.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . three-dimensional measurement device, 2A . . . first projection optical system, 2B . . . second projection optical system, 3 . . . interference optical system, 4A . . . first imaging system, 4B . . . second imaging system, 5 . . . control device, 11A . . . first light emitter, 11B . . . second light emitter, 20 . . . polarizing beam splitter, 20a . . . first face, 20b . . . second face, 20c . . . third face, 20d . . . fourth face, 21, 22 . . . quarter-wave plates, 23 . . . reference plane, 24 . . . mounting portion, 31A . . . quarter-wave plate, 31B . . . quarter-wave plate, 33A . . . first camera, 33B . . . second camera, 33B, 70A . . . polarization image sensor, 70B . . . polarization image sensor, 71 . . . light-receiving element array, 72 . . . polarizer array, 73 . . . microlens array, 74 . . . light-receiving element, 75 (75 $l$, 75b, 75c, 75d) . . . polarizer (first polarizer, second polarizer, third polarizer, fourth polarizer), W . . . work

What is claimed is:

1. A three-dimensional measurement device, comprising a light emitter that emits a predetermined light;
an optical system that splits an incident light from the light emitter into an object light and a reference light, irradiates a measurement object with the object light and irradiates a reference plane with the reference light, and recombines the object light and the reference light with each other and emits a combined light;
an imaging device that comprises an imaging element and takes an image of a light emitted from the optical system to obtain luminance image data, wherein the imaging element comprises a plurality of light-receiving elements and multiple different types of polarizers, the polarizers having different set angles of transmission axes and being arranged to have one-to-one correspondence with the light-receiving elements;
a storage device that stores transmission axis absolute angle data each obtained by a previous actual measurement of an absolute angle of a transmission axis of each of the polarizers; and
a control device that calculates, by a phase shift method, a phase difference between the reference light and the object light at a measurement position of the measurement object, based on a piece of luminance data of each pixel in the luminance image data and a piece of the transmission axis absolute angle data of each of the polarizers corresponding to the pixel, and measures a height of the measurement object at the measurement position.

2. The three-dimensional measurement device according to claim 1, wherein
the measurement position is a predetermined position of a plurality of pixels in the luminance image data, and
the control device measures the height of the measurement object at the measurement position, based on pieces of the luminance data of part or all of the pixels and pieces of the transmission axis absolute angle data of the polarizers respectively corresponding to the part or all of the pixels.

3. The three-dimensional measurement device according to claim 1, wherein
the measurement position is a predetermined position corresponding to one pixel in the luminance image data, and
the control device:
interpolates another piece of the luminance data other than the piece of the luminance data of the one pixel obtained by the imaging device, out of a plurality of pieces of luminance data required for measuring the height of the measurement object at the measurement position,
interpolates another piece of the transmission axis absolute angle data other than the piece of the transmission axis absolute angle data of the one pixel stored in the storage device, out of a plurality of pieces of transmission axis absolute angle data required for measuring the height of the measurement object at the measurement position, and
measures the height of the measurement object at the measurement position, based on the plurality of pieces of the luminance data and the plurality of pieces of the transmission axis absolute angle data including the interpolated luminance data and the interpolated transmission axis absolute angle data.

4. The three-dimensional measurement device according to claim 1, wherein
the control device:
by using four pieces of the luminance data and four pieces of the transmission axis absolute angle data respectively corresponding to each other for measuring the height of the measurement object at the measurement position,
calculates the phase difference at the measurement position by Expression (S1) given below, where the four pieces of the luminance data are respectively expressed by Iα, Iβ, Iγ, and Iδ, and the four pieces of the transmission axis absolute angle data are respectively expressed by α, β, γ, and δ:

[Math. 8]

$$\phi = \tan^{-1} \frac{-(I_\beta - I_\delta)(\sin 2\alpha - \sin 2\gamma) + (I_\alpha - I_\gamma)(\sin 2\beta - \sin 2\delta)}{(I_\beta - I_\delta)(\cos 2\alpha - \cos 2\gamma) - (I_\alpha - I_\gamma)(\cos 2\beta - \cos 2\delta)} \quad (S1)$$

where Iα denotes a first piece of the luminance data, Iβ denotes a second piece of the luminance data, Iγ denotes a third piece of the luminance data, Iδ denotes a fourth piece of the luminance data, α denotes a first piece of the transmission axis absolute angle data, β denotes a second piece of the transmission axis absolute angle data, γ denotes a third piece of the transmission axis absolute angle data, δ denotes a fourth piece of the transmission axis absolute angle data, and φ denotes the phase difference between the reference light and the object light.

5. The three-dimensional measurement device according to claim 1, wherein
the control device:
by using three pieces of the luminance data and three pieces of the transmission axis absolute angle data respectively corresponding to each other for measuring the height of the measurement object at the measurement position,
calculates the phase difference at the measurement position by Expression (S2) given below, where the three pieces of the luminance data are respectively expressed by $I\alpha$, $I\beta$ and $I\gamma$, and the three pieces of the transmission axis absolute angle data are respectively expressed by $\alpha$, $\beta$ and $\gamma$:

[Math. 9]

$$\phi = \tan^{-1}\frac{-(I_\beta - I_\gamma)(\sin 2\alpha - \sin 2\gamma) + (I_\alpha - I_\gamma)(\sin 2\beta - \sin 2\gamma)}{(I_\beta - I_\gamma)(\cos 2\alpha - \cos 2\gamma) - (I_\alpha - I_\gamma)(\cos 2\beta - \cos 2\gamma)} \quad (S2)$$

where $I\alpha$ denotes a first piece of the luminance data, $I\beta$ denotes a second piece of the luminance data, $I\gamma$ denotes a third piece of the luminance data, $\alpha$ denotes a first piece of the transmission axis absolute angle data, $\beta$ denotes a second piece of the transmission axis absolute angle data, $\gamma$ denotes a third piece of the transmission axis absolute angle data, and $\phi$ denotes the phase difference between the reference light and the object light.

6. A three-dimensional measurement device, comprising:
a light emitter that emits a predetermined light;
a polarizing beam splitter that has first to fourth faces, splits an incident light to the first face from the light emitter into two polarized lights of an object light and a reference light that have polarizing directions perpendicular to each other, irradiates a measurement object with the object light and irradiates a reference plane with the reference light, and recombines the object light and the reference light with each other and emits a combined light;
an imaging device that comprises an imaging element and takes an image of a light emitted from the second face of the polarizing beam splitter to obtain luminance image data, wherein the imaging element comprises a plurality of light-receiving elements and multiple different types of polarizers, the polarizers having different set angles of transmission axes and being arranged to have one-to-one correspondence with the light-receiving elements;
a first quarter-wave plate placed between the third face of the polarizing beam splitter and the reference plane, wherein the reference light enters the third face and is emitted from the third face;
a second quarter-wave plate placed between the fourth face of the polarizing beam splitter and the measurement object, wherein the object light enters the fourth face and is emitted from the fourth face;
a third quarter-wave plate placed between the second face of the polarizing beam splitter and the imaging device;
a storage device that stores transmission axis absolute angle data each obtained by a previous actual measurement of an absolute angle of a transmission axis of each of the polarizers; and
a control device that calculates, by a phase shift method, a phase difference between the reference light and the object light at a predetermined measurement position of the measurement object, based on a piece of luminance data of each pixel in the luminance image data and a piece of the transmission axis absolute angle data of each of the polarizers corresponding to the pixel, and measures a height of the measurement object at the measurement position.

7. The three-dimensional measurement device according to claim 6, wherein
the measurement position is a predetermined position of a plurality of pixels in the luminance image data, and
the control device measures the height of the measurement object at the measurement position, based on pieces of the luminance data of part or all of the pixels and pieces of the transmission axis absolute angle data of the polarizers respectively corresponding to the part or all of the pixels.

8. The three-dimensional measurement device according to claim 6, wherein
the measurement position is a predetermined position corresponding to one pixel in the luminance image data,
the control device:
interpolates another piece of the luminance data other than the piece of the luminance data of the one pixel obtained by the imaging device, out of a plurality of pieces of luminance data required for measuring the height of the measurement object at the measurement position,
interpolates another piece of the transmission axis absolute angle data other than the piece of the transmission axis absolute angle data of the one pixel stored in the storage device, out of a plurality of pieces of transmission axis absolute angle data required for measuring the height of the measurement object at the measurement position, and
measures the height of the measurement object at the measurement position, based on the plurality of pieces of the luminance data and the plurality of pieces of the transmission axis absolute angle data including the interpolated luminance data and the interpolated transmission axis absolute angle data.

9. The three-dimensional measurement device according to claim 6, wherein
the control device:
by using four pieces of the luminance data and four pieces of the transmission axis absolute angle data respectively corresponding to each other for measuring the height of the measurement object at the measurement position,
calculates the phase difference at the measurement position by Expression (S1) given below, where the four pieces of the luminance data are respectively expressed by $I\alpha$, $I\beta$, $I\gamma$, and $I\delta$, and the four pieces of the transmission axis absolute angle data are respectively expressed by $\alpha$, $\beta$, $\gamma$, and $\delta$:

[Math. 8]

$$\phi = \tan^{-1}\frac{-(I_\beta - I_\delta)(\sin 2\alpha - \sin 2\gamma) + (I_\alpha - I_\gamma)(\sin 2\beta - \sin 2\delta)}{(I_\beta - I_\delta)(\cos 2\alpha - \cos 2\gamma) - (I_\alpha - I_\gamma)(\cos 2\beta - \cos 2\delta)} \quad (S1)$$

where $I\alpha$ denotes a first piece of the luminance data, $I\beta$ denotes a second piece of the luminance data, $I\gamma$ denotes a third piece of the luminance data, $I\delta$ denotes a fourth piece of the luminance data, $\alpha$ denotes a first piece of the transmission axis absolute angle data, β denotes a second piece of the transmission axis absolute angle data, γ denotes a third piece of the transmission axis absolute angle data, δ denotes a fourth piece of the transmission axis absolute angle data, and ϕ denotes the phase difference between the reference light and the object light.

10. The three-dimensional measurement device according to claim 2, wherein
the control device:
by using three pieces of the luminance data and three pieces of the transmission axis absolute angle data respectively corresponding to each other for measuring the height of the measurement object at the measurement position,
calculates the phase difference at the measurement position by Expression (S2) given below, where the three pieces of the luminance data are respectively expressed by Iα, Iβ and Iγ, and the three pieces of the transmission axis absolute angle data are respectively expressed by α, β and γ:

[Math. 9]

$$\phi = \tan^{-1} \frac{-(I_\beta - I_\gamma)(\sin 2\alpha - \sin 2\gamma) + (I_\alpha - I_\gamma)(\sin 2\beta - \sin 2\gamma)}{(I_\beta - I_\gamma)(\cos 2\alpha - \cos 2\gamma) - (I_\alpha - I_\gamma)(\cos 2\beta - \cos 2\gamma)} \quad (S2)$$

where Iα denotes a first piece of the luminance data, Iβ denotes a second piece of the luminance data, Iγ denotes a third piece of the luminance data, α denotes a first piece of the transmission axis absolute angle data, β denotes a second piece of the transmission axis absolute angle data, γ denotes a third piece of the transmission axis absolute angle data, and ϕ denotes the phase difference between the reference light and the object light.

* * * * *

UNITED STATES PATENT AND TRADEMARK OFFICE
CERTIFICATE OF CORRECTION

| | |
|---|---|
| PATENT NO. | : 12,259,230 B2 |
| APPLICATION NO. | : 18/295845 |
| DATED | : March 25, 2025 |
| INVENTOR(S) | : Hiroyuki Ishigaki et al. |

It is certified that error appears in the above-identified patent and that said Letters Patent is hereby corrected as shown below:

In the Claims

At Column 35, Claim number 10, Line number 8, "claim 2" should read -- claim 6 --.

Signed and Sealed this
Twentieth Day of May, 2025

Coke Morgan Stewart
*Acting Director of the United States Patent and Trademark Office*